US012634432B2

(12) United States Patent　　　　(10) Patent No.:　US 12,634,432 B2
Yuan et al.　　　　　　　　　　　　(45) Date of Patent:　　　May 19, 2026

(54) PICTURE PREDICTION METHOD, ENCODER, DECODER, AND COMPUTER STORAGE MEDIUM

(71) Applicant: GUANGDONG OPPO MOBILE TELECOMMUNICATIONS CORP., LTD., Dongguan (CN)

(72) Inventors: Hui Yuan, Dongguan (CN); Yao Liu, Dongguan (CN); Ye Yang, Dongguan (CN); Ming Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 87 days.

(21) Appl. No.: 18/138,931

(22) Filed: Apr. 25, 2023

(65) Prior Publication Data

US 2023/0262212 A1　　Aug. 17, 2023

Related U.S. Application Data

(63) Continuation of application No. PCT/CN2020/124455, filed on Oct. 28, 2020.

(51) Int. Cl.
H04N 19/105　　　　(2014.01)
H04N 19/176　　　　(2014.01)
(Continued)

(52) U.S. Cl.
CPC ......... H04N 19/105 (2014.11); H04N 19/176 (2014.11); H04N 19/186 (2014.11); H04N 19/46 (2014.11)

(58) Field of Classification Search
CPC .. H04N 19/105; H04N 19/147; H04N 19/176; H04N 19/186; H04N 19/46; H04N 19/50; H04N 19/70
(Continued)

(56) References Cited

U.S. PATENT DOCUMENTS

2008/0304759　A1*　12/2008　Lee ......................... H04N 19/61
　　　　　　　　　　　　　　　　　　　　382/238
2011/0262050　A1*　10/2011　Liu ...................... H04N 19/194
　　　　　　　　　　　　　　　　　　　　382/238

(Continued)

FOREIGN PATENT DOCUMENTS

CN　　　　108259897　A　　　7/2018
CN　　　　110557646　A　　　12/2019
(Continued)

OTHER PUBLICATIONS

International Search Report issued in the international application No. PCT/CN2020/124455, mailed on Jul. 19, 2021.

(Continued)

*Primary Examiner* — Behrooz M Senfi
(74) *Attorney, Agent, or Firm* — BAYES PLLC

(57)　　　　　　　　ABSTRACT

The application discloses a picture prediction method, an encoder, a decoder and a computer storage medium. The method includes determining a prediction mode parameter of a current block; determining a reconstructed value of a first colour component of the current block and a value of a reference colour component of the current block, in response to the prediction mode parameter indicating determining a prediction value of the current block by using an attention-based artificial neural network model (ANNM) mode; and predicting, according to the reconstructed value of the first colour component of the current block and the value of the reference colour component of the current block, a second colour component of the current block, to determine a prediction value of the second colour component of the current block.

16 Claims, 9 Drawing Sheets

(a)

(b)

(51) Int. Cl.
    *H04N 19/186*     (2014.01)
    *H04N 19/46*     (2014.01)

(58) Field of Classification Search
    USPC ..................................................... 375/240.02
    See application file for complete search history.

(56)             References Cited

U.S. PATENT DOCUMENTS

| | | | | |
|---|---|---|---|---|
| 2013/0182971 | A1* | 7/2013 | Leontaris | .............. G06T 7/0002 |
| | | | | 382/275 |
| 2018/0084258 | A1* | 3/2018 | Kim | ..................... H04N 19/176 |
| 2020/0186796 | A1 | 6/2020 | Mukherjee et al. | |
| 2022/0058390 | A1* | 2/2022 | Tran | ..................... G06V 10/751 |
| 2023/0095387 | A1* | 3/2023 | Dumas | ................. H04N 19/167 |
| | | | | 375/240.26 |
| 2023/0117813 | A1* | 4/2023 | Deng | ................... H04N 19/132 |

FOREIGN PATENT DOCUMENTS

| | | |
|---|---|---|
| CN | 110602491 A | 12/2019 |
| CN | 111432208 A | 7/2020 |
| CN | 113692742 A * | 11/2021 ........... H04N 19/593 |
| EP | 3930324 A1 * | 12/2021 ............. H04N 19/44 |
| RU | 2805048 C2 * | 10/2023 ........... H04N 19/105 |

OTHER PUBLICATIONS

Written Opinion of the International Search Authority issued in the international application No. PCT/CN2020/124455, mailed on Jul. 19, 2021.

Marc Gorriz et al: "Chroma Intra Prediction with attention-based CNN architectures", Arxiv.org, Cornell University Library, 201 Olin Library Cornell University Ithaca, NY 14853, Jun. 27, 2020 (Jun. 27, 2020), XP081707908, abstract; figures 1, 2; paragraphs [0001], [0003], [0004], [0005]. 5 pages.

Li Yue et al: "A Hybrid Neural Network for Chroma Intra Prediction", 2018 25th IEEE International Conference on Image Processing (ICIP), IEEE, Oct. 7, 2018 (Oct. 7, 2018), pp. 1797-1801, XP033454967, DOI: 10.1109/ICIP.2018.8451396, abstract; figure 1; paragraphs [0001], [0002], [0003], [0005]. 5 bages.

Supplementary European Search Report in the European application No. 20959064.5, mailed on Aug. 4, 2023. 12 pages.

First Office Action of the European application No. 20959064.5, issued on Apr. 28, 2025. 5 pages.

\* cited by examiner

（a）                    （b）

PICTURE PREDICTION METHOD, ENCODER, DECODER, AND COMPUTER STORAGE MEDIUM

CROSS-REFERENCE TO RELATED APPLICATION

This is a continuation of International Application No. PCT/CN2020/124455 filed on Oct. 28, 2020, and entitled "IMAGE PREDICTION METHOD, ENCODER, DECODER, AND COMPUTER STORAGE MEDIUM", the disclosure of which is incorporated therein by reference in its entirety.

TECHNICAL FIELD

Embodiments of the present disclosure relate to the field of video coding and decoding technology, and more particularly to a picture prediction method, an encoder, a decoder and a computer storage medium.

BACKGROUND

With a higher requirement of people for video display quality, new forms of video applications such as high definition (HD) and ultra HD videos are emerging. H.265/ High Efficiency Video Coding (HEVC) can no longer meet a demand of rapid development of video applications. Joint Video Exploration Team (JVET) has developed a new video coding standard, H.266/Versatile Video Coding (VVC), and a test model corresponding to the coding standard is a VCC reference software test platform, i.e., a VVC Test Model (VTM).

In related technologies, an existing Cross-component Linear Model (CCLM) is used to predict a luma component and a chroma component. In terms of technical effects of the CCLM, although redundancy between the luma component and the chroma component is removed, spatial redundancy between a current block and an adjacent block is not removed. Meanwhile, the CCLM mode adopts a single linear model to predict the luma component and the chroma component, and limits prediction accuracy between different colour components, thus losing the coding and decoding efficiency.

DETAILED DESCRIPTION

In order to understand the features and technical contents of the embodiments of the disclosure in more detail, the implementation of these embodiments of the disclosure will be elaborated below in combination with the drawings. The attached drawings are for reference only and are not intended to limit the embodiments of the disclosure.

In a video picture, a first colour component, a second colour component, and a third colour component are generally used to represent a coding block (CB). Here, the three colour components are a luma component, a blue chroma component and a red chroma component respectively. Specifically, the luma component is generally denoted by a symbol Y, the blue chroma component is generally denoted by a symbol Cb or U, and the red chroma component is generally denoted by a symbol Cr or V. In this way, the video picture can be represented in an YCbCr format or YUV format.

In an embodiment of the present disclosure, the first colour component may be the luma component, the second colour component may be the blue chroma component, and the third colour component may be the red chroma component, but the embodiments of the present disclosure are not specifically limited thereto.

The following will describe relevant technical solutions for various current prediction technologies.

In H.266/VVC, intra prediction modes for chroma components can be classified into two categories. The first category is an intra prediction mode following HEVC, which can include the following five modes: a derived mode (DM), a planar (PLANAR) mode, a direct current (DC) mode, a vertical (VER) mode and a horizontal (HOR) mode. The second category is a mode specific to VVC, i.e., a cross-component linear model (CCLM) mode proposed to make full use of a correlation between colour components, which can include three modes, such as, a linear model (LM) mode, a linear model_left (LM_L) mode and a linear model_above (LM_A) (or linear model_top LM_T) mode.

Figure 1:
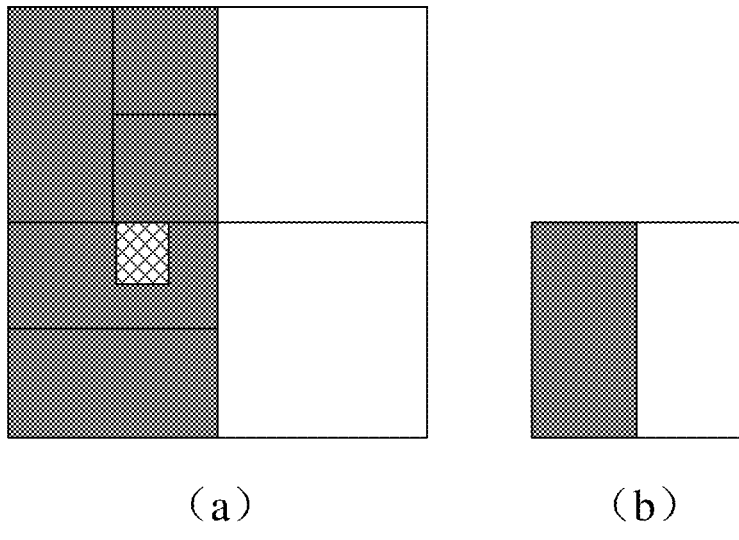
FIG. 1 illustrates a schematic diagram of a position of a central luma block corresponding to a chroma block in a DM mode provided by the related art.

Here, the PLANAR mode is mainly used in an area with a relatively smooth picture texture and a gradient process. Reference pixels on four adjacent boundaries, such as an upper boundary, a bottom boundary, a left boundary and a right boundary, of a pixel to be predicted in a current block are used for a linear interpolation summation and averaging processing, to obtain a prediction value of a current pixel. The DC mode is mainly used in an area of a flat picture with a smooth texture and no gradient. All reference pixels in an upper row and a left column are averaged to obtain a prediction value of the pixel in the current block. The DM mode is a prediction mode proposed based on a correlation between a luma component and a chroma component. According to the VVC standard, an intra prediction mode for the luma component has been obtained before decoding the chroma component. Correspondingly, during the coding process, the luma component has been coded before coding the chroma component. In the DM mode, a prediction mode for a chroma block may follow a prediction mode for a central luma block corresponding to the chroma block. FIG. 1 illustrates a schematic diagram of a position of a central luma block corresponding to a chroma block in a DM mode provided by the related art.

Exemplarily, a coding tree unit (CTU) in a YUV420 format is shown in FIG. 1. Here, (a) a luma component of the CTU (hereinafter referred to as "luma CTU") is shown, and (b) a chroma component of the CTU (hereinafter referred to as "chroma CTU") is shown. In addition, a block area filled with gray on the left side of (b) represents a current chroma coding unit (CU), and a block area filled with gray on the left side of (a) represents a luma CU corresponding to the current chroma CU. Here, a block area filled with grid lines is a location of the central luma block in the DM mode. In the DM mode, the intra prediction mode for the current chroma CU can be set according to the intra prediction mode for the central luma block.

Figure 2:
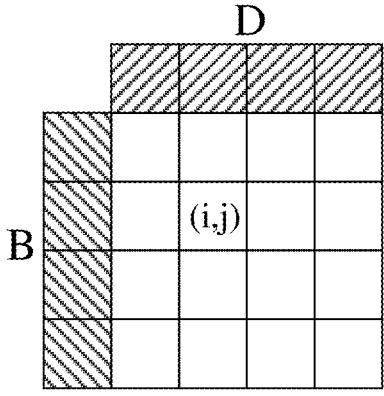
FIG. 2 illustrates a schematic diagram of positions of a current block and adjacent reference pixels provided by the related art.

It can be understood that, the DC mode is suitable for a large and flat area. FIG. 2 illustrates a schematic diagram of positions of a current block and adjacent reference pixels provided by the related art. As shown in FIG. 2, (i, j) denotes a pixel corresponding to a horizontal coordinate of i and a vertical coordinate of j in the current block, B denotes adjacent reference pixels on the left side of the current block (filled with right slashes), and D denotes adjacent reference pixels on the upper side of the current block (filled with left slashes).

According to FIG. 2, a specific prediction process of the DC mode is as follows.

In response to a width of the current block being equal to a height of the current block, an average value of pixels of B and D may be used as a prediction value of a whole block.

In response to the width of the current block being greater than the height of the current block, an average value of pixels of D may be used as the prediction value of the whole block.

In response to the width of the current block being less than the height of the current block, an average value of pixels of B may be used as the prediction value of the whole block.

Figure 3:
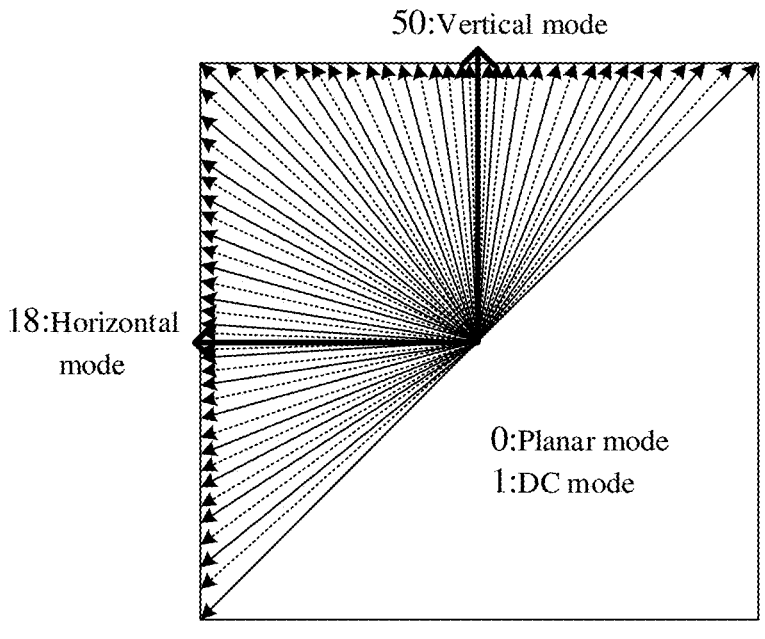
FIG. 3 illustrates a schematic diagram of a position of an angle prediction mode provided by the related art.

For the horizontal mode and the vertical mode, FIG. 3 illustrates a schematic diagram of an angle prediction mode provided by the related art. As shown in FIG. 3, mode No. 0 may denote the PLANAR mode, and mode No. 1 may denote the DC mode. The mode number of the angle prediction mode may include 2~66, i.e. there are 65 modes, mode No. 18 denotes the horizontal mode and mode No. 50 denotes the vertical mode.

It can also be understood that, a CCLM mode may include three modes, i.e., a LM mode, a LM_T mode, and a LM_L mode. A main difference between the three modes lies in that different adjacent reference pixels are used. Here, the LM mode builds a linear model by using adjacent reference pixels on a left side and an upper side, the LM_L mode builds the linear model by using only the adjacent reference pixels on the left side, and the LM_A mode builds the linear model by using only the adjacent reference pixels on the upper side.

Specifically, a method for determining a chroma intra prediction value by using the CCLM mode is as follows, and the calculation model is:

$$Pred_C(i, j) = \alpha \cdot Rec'_L(i, j) + \beta \qquad (1)$$

Here, $Pred_C(i, j)$ represents a prediction value of a chroma component of a pixel (i, j) in the CU, $$Rec'_L(i, j)$$

represents a reconstructed value of a luma component of a (downsampled) pixel (i, j) in the same CU, and model parameters $\alpha$ and $\beta$ may be derived according to at most chroma samples of four adjacent reference pixels and four downsampled luma samples corresponding to the chroma samples. The specific calculation process of $\alpha$ and $\beta$ is as follows.

Firstly, the selected four luma sample points may be downsampled, then four comparisons may be performed, to find the smallest two points (denoted by $$x_A^0 \text{ and } x_A^1)$$

and the two largest points (denoted by $$x_B^0 \text{ and } x_B^1).$$

Figure 4:
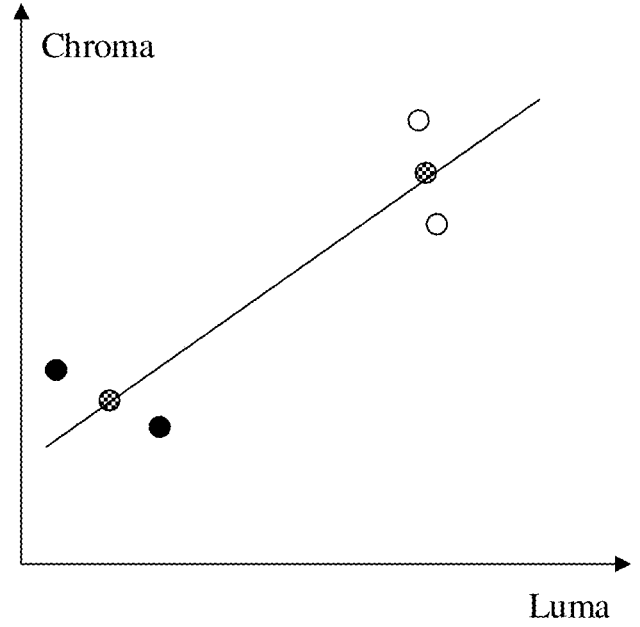
FIG. 4 illustrates a diagram of a structure of a built linear model provided by the related art.

The chroma sample points corresponding to the smallest two points are denoted by $$y_A^0 \text{ and } y_A^1$$

respectively, and the chroma sample points corresponding to the largest two points are denoted by $$y_B^0 \text{ and } y_B^1$$

respectively. As shown in FIG. 4, the horizontal axis (i.e. the X axis) is used to represent luminance (Luma), and the vertical axis (i.e. the Y axis) is used to represent chrominance (Chroma). In FIG. 4, the two points filled with black are the two smallest points, and the two points filled with white are the two largest points. The points (denoted by $X_a$ and $Y_a$) filled with gridlines, between the two points filled with black, are used to represent a luma average and a chroma average respectively, and the points (denoted by $X_b$ and $Y_b$) filled with gridlines, between the two points filled with white, are used to represent the luma average and the chroma average respectively. Here, the calculation of $X_a$, $Y_a$, $X_b$, $Y_b$ is as follows:

$$\begin{cases} X_a = \left(x_A^0 + x_A^1 + 1\right) >> 1 \\ Y_a = \left(y_A^0 + y_A^1 + 1\right) >> 1 \\ X_b = \left(x_B^0 + x_B^1 + 1\right) >> 1 \\ Y_b = \left(y_B^0 + y_B^1 + 1\right) >> 1 \end{cases} \qquad (2)$$

In this way, the model parameters may be derived according to $X_a$, $Y_a$, $X_b$, $Y_b$. Here, the derivation of the model parameter a is shown in Equation (3), and the derivation of the model parameters β is shown in Equation (4):

$$\alpha = \frac{Y_a - Y_b}{X_a - X_b} \qquad (3)$$

$$\beta = Y_b - \alpha \cdot X_b \qquad (4)$$

After obtaining α and β, a chroma prediction value of the current block may finally be calculated according to Equation (1).

Thus, based on the aforementioned chroma intra prediction modes existed (i.e. has been existed) in VVC, Table 1 illustrates an example of a candidate list of VVC chroma intra prediction modes composed by the aforementioned several chroma intra prediction modes. As shown in Table 1, there are eight intra prediction modes, which include the DM mode, the LM mode, the LM_L mode, the LM_A mode, the DC mode, the PLANAR mode, the VER mode and the HOR mode respectively.

TABLE 1

| Number | Name |
|--------|--------|
| 1 | DM |
| 2 | LM |
| 3 | LM_L |
| 4 | LM_A |
| 5 | DC |
| 6 | PLANAR |
| 7 | VER |
| 8 | HOR |

During the coding process, after building and completing the candidate list of the chroma intra prediction modes shown in Table 1, an optimal chroma mode needs to be selected. The specific process is as follows.

The selection of the optimal chroma mode may be roughly divided into two stages, i.e., a rough selection stage and a fine selection stage. In the rough selection stage, the prediction is performed based on five modes, such as, the DC mode, the vertical mode, the horizontal mode, the LM_L mode and the LM_A mode. A sum of absolute transformed difference (SATD) is used as a measurement index; then, the two modes with the largest distortion values are removed according to a SATD sequence; and remaining three modes are added into the fine selection stage. In the fine selection stage. The remaining three modes, i.e., the PLANAR mode, the LM mode and the DM mode, are used for performing the prediction in sequence, a cost of rate distortion optimization (RDO) for each of the modes is calculated, and then the mode with the least cost is taken as a finally selected optimal chroma moded. In addition, if the selected mode is a default mode (such as, the DC mode, the PLANAR mode, the VER mode, and the HOR mode) and is the same as the DM mode, the default mode needs to be replaced by the mode 66.

That is, in the related art, the luma component of the current block is used by the CCLM mode to predict the chroma component of the current block. The technical effect is that only redundancy between the luma component and the chroma component can be removed, but spatial redundancy between the current block and adjacent blocks cannot be removed. At the same time, in order to reduce the redundancy between the luma component and the chroma component, only a linear model is used by the CCLM mode in VVC for the prediction between the luma component and the chroma component, which limits the prediction accuracy between different color components. In other words, the current related art has some shortcomings, such that the prediction accuracy of the luma components is relatively low, thereby losing the coding and decoding efficiency.

Based on this, an embodiment of the disclosure provides a picture prediction method. The basic idea of the method is that: in an encoder or decoder, after obtaining a prediction mode parameter of a current block, a reconstructed value of a first colour component of the current block and a value of a reference colour component of the current block are determined, in response to the prediction mode parameter indicating determining a prediction value of the current block by using an attention-mechanism-based artificial neural network model (ANNM) mode; and a second colour component of the current block is predicted by using the ANNM mode according to the reconstructed value of the first colour component of the current block and the value of the reference colour component of the current block, to determine a prediction value of the second colour component of the current block. Therefore, the present disclosure proposes predicting the colour components of the current block by using an ANNM mode, which fully considers a relationship between the first colour component and the reference colour component of the current block, such that a more accurate prediction value of the second colour component can be obtained by using the ANNM mode, which may not only improve the accuracy of colour component prediction, but also reduce the number of bits to be transmitted, thereby reducing the bitrate and further improving the coding and decoding efficiency.

Embodiments of the present disclosure will be described in detail below with reference to the accompanying drawings.

Figure 5A:
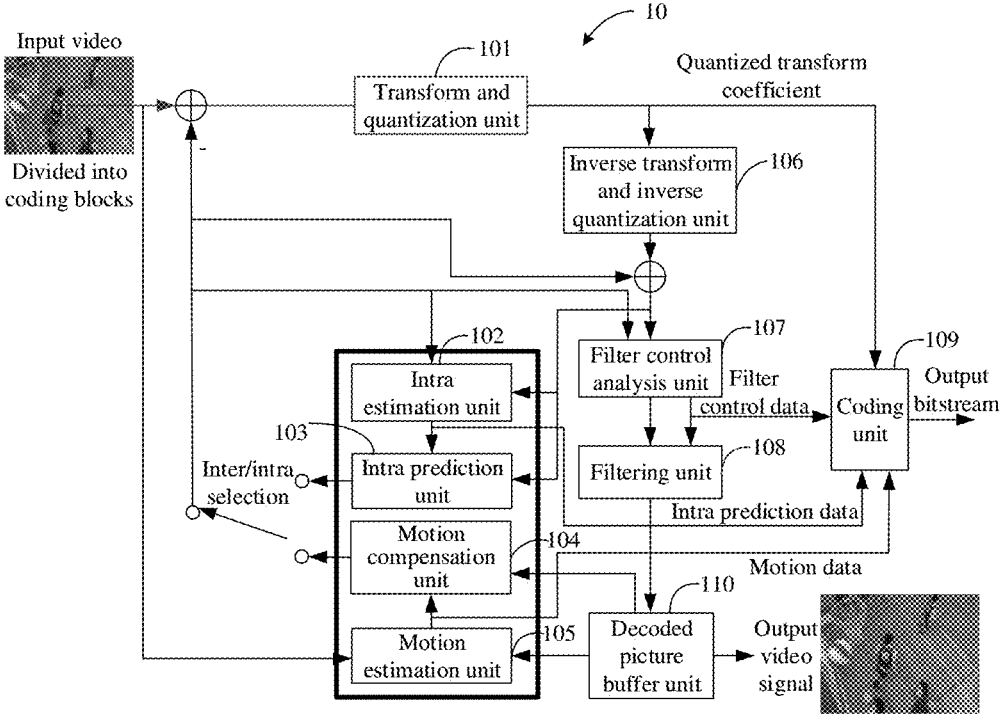
FIG. 5A illustrates a block diagram of a video coding system according to an embodiment of the present disclosure.

Referring to FIG. 5A, FIG. 5A illustrates a block diagram of a video coding system according to an embodiment of the present disclosure. As shown in FIG. 5A, the video coding system 10 includes a transform and quantization unit 101, an intra estimation unit 102, an intra prediction unit 103, a motion compensation unit 104, a motion estimation unit 105, an inverse transform and inverse quantization unit 106, a filter control analysis unit 107, a filtering unit 108, a coding unit 109, a decoded picture buffer unit 110 and the like. Here, the filtering unit 108 may implement de-blocking filtering and sample adaptive offset (SAO) filtering. The coding unit 109 may implement header information coding and context-based adaptive binary arithmetic coding (CA-BAC). For an original video signal that is input, a video coding block may be obtained by applying partitioning to a coding tree unit (CTU). Then, the video coding block may be transformed by passing residual pixel information obtained by the intra prediction or inter prediction through the transform and quantization unit 101, which includes transforming the residual information from a pixel domain to a transform domain and quantizing a resulted transform coefficient to further reduce the bitrate. The intra estimation unit 102 and the intra prediction unit 103 may be used to perform the intra prediction on the video coding block. Explicitly, the intra estimation unit 102 and the intra prediction unit 103 may be used to determine the intra prediction mode for coding the video coding block. The motion compensation unit 104 and the motion estimation unit 105 may be used to perform the inter prediction coding of a received video coding block relative to one or more blocks of one or more reference pictures, to provide temporal prediction information. The motion estimation performed by the motion estimation unit 105 may be a process for generating motion vectors that are used to estimate the motion of the video coding block. Then, the motion compensation may be performed by the motion compensation unit 104 based on the motion vectors determined by the motion estimation unit 105. After determining the intra prediction mode, the intra prediction unit 103 may be further used to provide selected intra prediction data to the coding unit 109, and the motion estimation unit 105 may be used to transmit the motion vector data that is determined through calculation to the coding unit 109 too. In addition, the inverse transform and inverse quantization unit 106 may be used for the reconstruction of the video coding block. A residual block may be reconstructed in the pixel domain, a blocking effect artifact of the reconstructed residual block may be removed by the filter control analysis unit 107 and the filtering 108; and then, the reconstructed residual block may be added into a prediction block in a picture in the decoded picture buffer unit 110, to generate a reconstructed video coding block. The coding unit 109 may be used to code various coding parameters and quantized transform coefficients. In a CABAC-based coding algorithm, a context content may be based on adjacent coding blocks, and may be used for coding the information that indicates the determined intra prediction mode, to output a bitstream of the video signal. The decoded picture buffer unit 110 may be used to store the reconstructed video coding block for prediction reference. As the progress of the video picture coding, new reconstructed video coding blocks may be continuously generated, and all of the reconstructed video coding blocks may be stored in the decoded picture buffer unit 110.

Figure 5B:
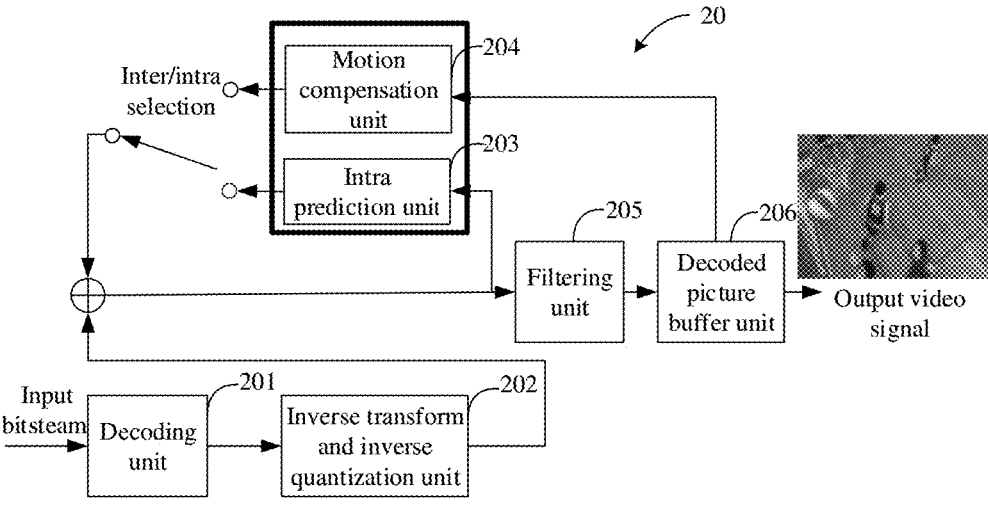
FIG. 5B illustrates a block diagram of a video decoding system according to an embodiment of the present disclosure.

Referring to FIG. 5B, FIG. 5B illustrates an example of a block diagram of a video decoding system according to an embodiment of the present disclosure. As shown in FIG. 5B, the video decoding system 20 includes a decoding unit 201, an inverse transform and inverse quantization unit 202, an intra prediction unit 203, a motion compensation unit 204, a filtering unit 205, a decoded picture buffer unit 206, and the like. Here, the decoding unit 201 may implement header information decoding and CABAC decoding. The filtering unit 205 may implement a de-blocking filtering and an SAO filtering. After the input video signal is coded by the coding process as shown in FIG. 5A, the bitstream of the video signal may be output. The bitstream may be further input into the video decoding system 20, and the bitstream may firstly pass through the decoding unit 201 to obtain a decoded transform coefficient. The decoded transform coefficient may be processed by the inverse transform and inverse quantization unit 202, to generate a residual block in the pixel domain. The intra prediction unit 203 may be used to generate prediction data for a current video decoding block, based on the determined intra prediction mode and data from previously decoded blocks of the current video frame or picture. The motion compensation unit 204 may be used to determine prediction information for the video decoding block by parsing the motion vectors and other associated syntax elements, and use the prediction information to generate a prediction block of the video decoding block that is being decoded. The decoded video block may be formed by summing the residual block from the inverse transform and inverse quantization unit 202 and the corresponding prediction block generated by the intra prediction unit 203 or the motion compensation unit 204. The decoded video signal may pass through the filtering unit 205, to remove the blocking effect artifact, which can improve the video quality. Then, the decoded video block may be stored in the decoded picture buffer unit 206. The decoded picture buffer unit 206 may be used to store reference pictures for subsequent intra prediction or motion compensation; meanwhile, the decoded picture buffer unit 206 may also be used to output the video signal, i.e. the restored original video signal may be obtained.

It should be noted that, the picture prediction method in the embodiment of the present disclosure is mainly applied to the prediction part as shown in FIG. 5A (e.g., the part of the black bold block diagram in FIG. 5A, especially the part of the intra prediction unit 103 in FIG. 5A) and the prediction part as shown in FIG. 5B (e.g., the part of the black bold block diagram in FIG. 5B, especially the part of the intra prediction unit 203 in FIG. 5B). That is, in the embodiment of the present disclosure, the picture prediction method may be applied to the video coding system, the video decoding system, or even to both the video coding system and the video decoding system at the same time, which, however, is not limited in the embodiments of the present disclosure. Here, when the picture prediction method is applied to the prediction part shown in FIG. 5A, the "current block" may specifically refer to the current coding block in the intra prediction. Additionally, when the picture prediction method is applied to the prediction part shown in FIG. 5B, the "current block" may specifically refer to the current decoding block in the intra prediction.

It should also be noted that, the "first", "second" and "third" mentioned throughout the description are only for distinguishing different features, and do not have the functions of limiting a priority, a sequence, a size relationship, and so on.

In one embodiment of the present disclosure, the picture prediction method according to the embodiment of the present disclosure may be applied to a video coding apparatus, i.e. an encoder. The functions realized by the method can be realized by calling a computer program by a first processor in the encoder. Of course, the computer program can be stored in a first memory. It can be seen that the encoder includes at least the first processor and the first memory.

Figure 6:
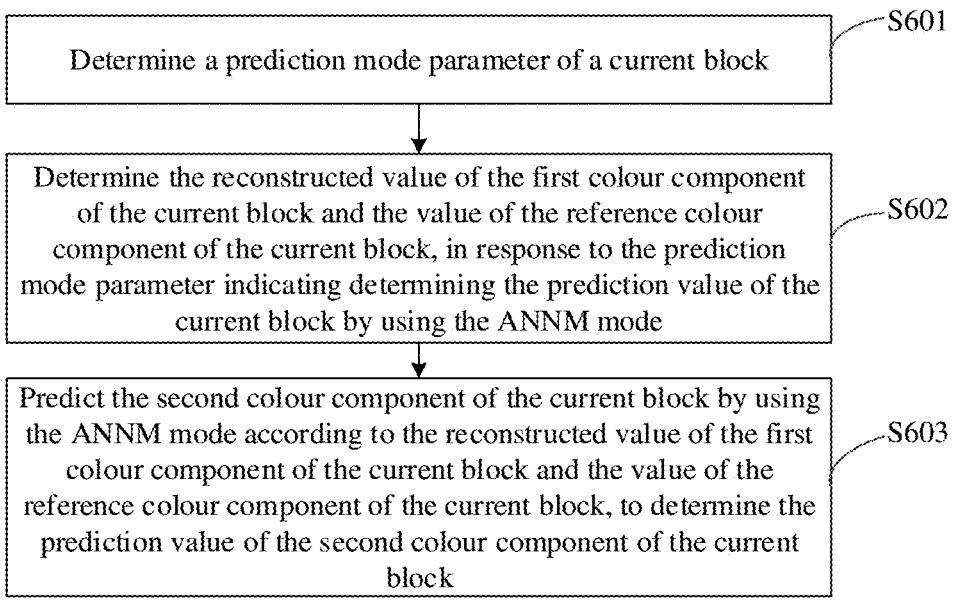
FIG. 6 illustrates a flow chart of a picture prediction method according to an embodiment of the present disclosure.

Based on the application scenario example shown in FIG. 5A, FIG. 6 illustrates a flow chart of a picture prediction method according to an embodiment of the present disclosure. As shown in FIG. 6, the method includes the following steps of S601 to S603.

In the step of S601, a prediction mode parameter of a current block is determined.

It should be noted that, the video picture can be divided into a plurality of picture blocks, and each picture block to be coded currently can be referred to as a Coding Block (CB). Here, each coding block may include a first colour component, a second colour component and a third colour component. A current block may be a coding block in the video picture to be used currently for performing the prediction for the first colour component to be predicted, the second colour component to be predicted or the third colour component.

Here, assuming that the first colour component is to be predicted for the current block, and the first colour component is a luma component, i.e. the colour component to be predicted is the luma component, the current block may also be referred to as a luma block. Alternatively, assuming that the second colour component is to be predicted for the current block, and the second colour component is a chroma component, i.e. the colour component to be predicted is the chroma component, the current block may also be referred to as a chroma block.

It should also be noted that, the prediction mode parameter may be used to indicate the prediction mode for the current block and the parameter related to the prediction mode. Generally, the prediction mode parameter may be determined according to a distortion value. In a specific embodiment, the prediction mode parameter may be determined based on a cost result of rate distortion optimization (RDO). Here, in a more specific implementation, the distortion value may be calculated by using a mean square error (MSE), and then, the prediction mode parameter of the current block may be determined in the RDO manner, which, however, is not limited in the embodiments of the present disclosure.

It can be understood that, the embodiment of the present disclosure provides an attention-based artificial neural network model (ANNM) mode. In the encoder, in a possible embodiment, the prediction mode parameter of the current block may be determined from a target prediction mode and the ANNM mode. Specifically, in some embodiments, the operation of determining the prediction mode parameter of the current block may include: determining the target prediction mode for the current block from a first candidate prediction mode set; and determining, based on the ANNM mode and the target prediction mode, the prediction mode parameter of the current block.

In a specific embodiment, the operation of determining, based on the ANNM mode and the target prediction mode, the prediction mode parameter of the current block, may include actions of: calculating a first rate-distortion cost result of the current block based on the ANNM mode, and calculating a second rate-distortion cost result of the current block based on the target prediction mode; and selecting an optimal rate-distortion cost result from the first rate-distortion cost result and the second rate-distortion cost result, and determining a prediction mode corresponding to the optimal rate-distortion cost result as the prediction mode parameter of the current block.

It should be noted that, the first candidate prediction mode set may include one or more candidate prediction modes, and the first candidate prediction mode set does not include the ANNM mode. Here, the one or more candidate prediction modes may specifically refer to an existing candidate prediction mode in VVC at present. The one or more candidate prediction modes may include an intra prediction mode, an inter prediction mode, and a cross-component prediction mode. The intra prediction mode may include a PLANAR mode, a DC mode, a DM mode, a VER mode, a HOR mode, an angle prediction mode, a matrix weighted intra prediction (MIP) mode and the like. The inter prediction mode may include a merge mode, a combined inter and intra prediction (CIIP) mode, a geometric partitioning mode (GPM), and the like. Additionally, the cross-component prediction mode may include a cross-component prediction mode for a same picture and a cross-component prediction mode across pictures.

It should also be noted that, the target prediction mode may be the intra prediction mode or the inter prediction mode. Furthermore, the target prediction mode may be a cross-component prediction mode within a same picture and a cross-component prediction mode across pictures. In general, the cross-component prediction mode may typically refer to the cross-component prediction mode across pictures, such as, a CCLM mode, which may further include a LM mode, a LM_L mode and a LM_A mode.

Further, for the determination of the target prediction mode, in some embodiments, the operation of determining the target prediction mode for the current block from the first candidate prediction mode set may include actions of precoding the current block by using the one or more candidate prediction modes in the first candidate prediction mode set respectively, to determine one or more pre-coding results, each corresponding to a respective one of the one or more candidate prediction modes; and determining, based on the one or more pre-coding results, the target prediction mode for the current block from the one or more candidate prediction modes.

In a specific embodiment, the operation of determining, based on the one or more pre-coding results, the target prediction mode for the current block from the one or more candidate prediction modes may include actions of obtaining, based on the one or more pre-coding results, one or more rate-distortion cost results, each corresponding to a respective one of the one or more candidate prediction modes; and selecting an optimal rate-distortion cost result from the one or more rate-distortion cost results, and determining a candidate prediction mode corresponding to the optimal rate-distortion cost result as the target prediction mode for the current block.

It should be noted that, in the encoder, the one or more candidate prediction modes may be used for precoding the colour components to be predicted of the current block respectively, and the pre-coding results corresponding to the one or more candidate prediction modes may be obtained. Here, the pre-coding results may be one or more distortion values, each corresponding to a respective one of the one or more candidate prediction modes, one or more rate-distortion cost results, each corresponding to a respective one of the one or more candidate prediction modes, or even other cost results, each corresponding to a respective one of the one or more candidate prediction modes. Exemplarily, after obtaining the one or more rate-distortion cost results, each corresponding to a respective one of the one or more candidate prediction modes, according to the one or more the pre-coding results, the optimal rate-distortion cost result may be selected from the obtained one or more rate-distortion cost results, to determine the target prediction mode for the current block.

In an embodiment of the present disclosure, the encoder may select the prediction mode corresponding to the optimal rate-distortion cost result from the target prediction mode and the ANNM mode, to determine the prediction mode parameter of the current block. Specifically, after determining the target prediction mode, the first rate-distortion cost result (denoted by RDC1) of the current block in the ANNM mode and the second rate-distortion cost result (denoted by RDC2) of the current block in the target prediction mode may be calculated respectively. Then, the optimal rate-distortion cost result may be selected from RDC1 and RDC2, to determine the prediction mode parameter of the current block.

Specifically, in some embodiments, the operation of calculating the first rate-distortion cost result of the current block based on the ANNM mode may include actions of predicting the colour component to be predicted of the current block by using the ANNM mode, to obtain a first prediction value of the current block; calculating a difference between the first prediction value of the current block and a true value of the current block, to obtain a first distortion value of the current block; and calculating the first rate-distortion cost result of the current block, according to the first distortion value of the current block and a preset rate-distortion model.

In some embodiments, the operation of calculating the second rate-distortion cost result of the current block based on the target prediction mode may include actions of predicting the colour component to be predicted of the current block by using the target prediction mode, to obtain a second prediction value of the current block; calculating a difference between the second prediction value of the current block and the true value of the current block, to obtain a second distortion value of the current block; and calculating the second rate-distortion cost result of the current block, according to the second distortion value of the current block and the preset rate-distortion model.

It should be noted that, the preset rate-distortion model may be regarded as a relationship function among a distortion value, a bitrate and a Lagrange multiplier. Assuming that the distortion value is denoted by D, the bitrate is denoted by R, and the Lagrange multiplier is denoted by $\lambda$, then the preset rate-distortion model may be shown in Equation (5), $$J = D + \lambda \cdot R \qquad (5)$$

Here, J represents the rate-distortion cost result. Regardless of which the prediction mode is used, the process of calculating the rate-distortion cost result is the same. In the embodiment of the present disclosure, calculating the first rate-distortion cost result of the current block in the ANNM mode is illustrated as an example. Specifically, the colour component to be predicted of the current block may be predicted by using the ANNM mode, to obtain the first prediction value of the current block. Then, the first distortion value (denoted by D1) of the current block may be calculated by using the mean square error (MSE) according to the first prediction value of the current block and the true value of the current block. At this time, assuming that the bitrate R is 1, the first rate-distortion cost result (represented by RDC1) in the ANNM mode may be calculated by the preset rate-distortion model shown in Equation (5), which is denoted by RDC1=D1+$\lambda$. Similarly, the second rate-distortion cost result (represented by RDC2) in the target prediction mode can be calculated, and the optimal rate-distortion cost result can be selected from RDC1 and RDC2, so as to determine the prediction mode parameter of the current block.

That is, after precoding the colour components to be predicted of the current block by using the one or more candidate prediction modes, the rate-distortion cost results corresponding to the candidate prediction modes may be obtained. Then, the optimal rate-distortion cost result may be selected from the obtained rate-distortion cost results, and the candidate prediction mode corresponding to the optimal rate-distortion cost result may be determined as the target prediction mode for the current block. Next, the first rate-distortion cost result of the current block in the ANNM mode and the second rate-distortion cost result of the current block in the target prediction mode may be calculated respectively. Finally, the optimal rate-distortion cost result may be selected from the first rate-distortion cost result and the second rate-distortion cost result, and the prediction mode parameter of the current block may be determined.

In the encoder, for the determination of the prediction mode parameter, in another possible embodiment, the prediction mode parameter of the current block may be determined from a second candidate prediction mode set. Specifically, in some embodiments, the operation for determining the prediction mode parameter of the current block may include actions of determining a second candidate prediction mode set; precoding the current block by using one or more candidate prediction modes in the second candidate prediction mode set respectively, to determine one or more pre-coding results, each corresponding to a respective one of the one or more candidate prediction modes; and determining, based on the one or more pre-coding results, the prediction mode parameter of the current block from the one or more candidate prediction modes.

In a specific embodiment, the operation of determining, based on the one or more pre-coding results, the prediction mode parameter of the current block from the one or more candidate prediction modes may include actions of obtaining, based on the one or more pre-coding results, one or more rate-distortion cost results, each corresponding to a respective one of the one or more candidate prediction modes; and selecting an optimal rate-distortion cost result from the one or more rate-distortion cost results, and determining a candidate prediction mode corresponding to the optimal rate-distortion cost result as the prediction mode parameter of the current block.

It should be noted that, the second candidate prediction mode set may include one or more candidate prediction modes, and the second candidate prediction mode set may further include the ANNM mode. Here, the one or more candidate prediction modes may include not only the existing candidate prediction modes in VVC, but also the ANNM mode. Thus, the prediction mode parameter of the current block may be determined from such candidate prediction modes, to determine whether the ANNM mode is to be used or not to be used.

In the encoder, for the determination of prediction mode parameter, in another possible implementation, a preset candidate mode list (as shown in Table 1) may be built, and meanwhile, the ANNM mode may also be added into the preset candidate mode list as one of the candidate prediction modes. At this time, in the preset candidate mode list, firstly, three better prediction modes may be selected from the DC mode, the LM_L mode, the LM_A mode, the VER mode and the HOR mode according to a SATD measurement index. Secondly, the current block may be precoded according to the selected three prediction modes and the ANNM mode, the LM mode, the PLANAR mode and the DM mode respectively, to determine the rate-distortion cost results corresponding to the above prediction modes. Thirdly, an optimal rate-distortion cost result may be selected from the determined rate-distortion cost results, to further determine an optimal prediction mode. Finally, the optimal prediction mode may be marked, and the optimal prediction mode may be determined as the prediction mode parameter of the current block.

Further, after determining the prediction mode parameter, a mode flag bit may also be set to be signaled into the bitstream. In some embodiments, for the step of S601, after determining the prediction mode parameter of the current block, the method may further include actions of setting the mode flag bit for the current block, where the mode flag bit is configured to indicate a prediction mode to be used by the current block; and signaling the mode flag bit into the bitstream.

Here, in some embodiments, the operation of setting the mode flag bit for the current block may include actions of setting the mode flag bit to be a first value, in response to the prediction mode parameter of the current block indicating that the ANNM mode is to be used by the current block; and setting the mode flag bit to be a second value, in response to the prediction mode parameter of the current block indicating that the ANNM mode is not to be used by the current block.

It should be noted that, the mode flag bit may be a manner of indicating the prediction mode in the bitstream. Typically, a 1-bit (bit) mode flag bit may be used to mark the prediction mode to be used by the current block, and the mode flag bit may be signaled into the bitstream, so as for the decoder to obtain the prediction mode parameter of the current block by parsing the bitstream.

In one possible implementation, the first value may be 1 and the second value may be 0; or, the first value may be "true" and the second value may be "false". In another possible implementation, the first value may be 0 and the second value may be 1; or, the first value may be "false" and the second value may be "true".

That is, there are two cases for setting the mode flag bit, which may include (1) a mode flag bit (annm_flag) for the ANNM mode. At this time, if the prediction mode parameter of the current block indicates that the ANNM mode is to be used by the current block, the mode flag bit may be set to be 1 or "true"; or, if the prediction mode parameter of the current block indicates that the ANNM mode is not to be used by the current block, the mode flag bit may be set to be 0 or "false". Additionally, the two cases for setting the mode flag bit may further include (2) a mode flag bit (non_ANNM_flag) for the non-ANNM mode. At this time, if the prediction mode parameter of the current block indicates that the ANNM mode is to be used by the current block, the mode flag bit may be set to be 0 or "false"; or, if the prediction mode parameter of the current block indicates that the ANNM mode is not to be used by the current block, the mode flag bit may be set to be 1 or "true".

It should also be noted that, after determining the prediction mode parameter, a mode index number may also be set, so as to signal the same into the bitstream. In some embodiments, for the step of S601, after determining the prediction mode parameter of the current block, the method may further include operations of setting the mode index number for the current block, where the mode index number is configured to indicate a prediction mode to be used by the current block; and signaling the mode index into the bitstream.

Here, in some embodiments, the operation of setting the mode index number for the current block may include actions of setting a value of the mode index to be equal to an index corresponding to using the ANNM mode, in response to the prediction mode parameter of the current block indicating that the ANNM mode is to be used by the current block; and setting the value of the mode index to be not equal to the index corresponding to using the ANNM mode, in response to the prediction mode parameter of the current block indicating that the ANNM mode is not to be used by the current block.

It should be noted that, the mode index number may be another manner of indicating the prediction mode in the bitstream. At this time, if the prediction mode parameter of the current block indicates that the ANNM mode is to be used by the current block, the value of the mode index number may be set to be equal to the index number corresponding to using the ANNM mode; or, if the prediction mode parameter of the current block indicates that the ANNM mode is not to be used by the current block, the value of the mode index number may be set to be not equal to the index number corresponding to using the ANNM mode. Additionally, the mode index number may be signaled into the bitstream, so as for the decoder to obtain the prediction mode parameter of the current block by parsing the bitstream.

Thus, after determining the prediction mode parameter of the current block, the current block may be finally coded by using the determined prediction mode, such that a prediction residual error may be relatively small, and the coding efficiency can be improved.

In the step of S602, the reconstructed value of the first colour component of the current block and the value of the reference colour component of the current block are determined, in response to the prediction mode parameter indicating determining the prediction value of the current block by using the ANNM mode.

It should be noted that, when the prediction mode parameter indicates determining the prediction value of the current block by using the ANNM mode, the reconstructed value of the first colour component of the current block and the value of a reference colour component of the current block may be obtained.

In an embodiment of the present disclosure, the reference colour component may include one or more colour components in the current picture. Here, the current picture may refer to a picture in which the current block is located, and the one or more colour components may include at least one of the first colour component or the second colour component.

In some embodiments, the operation of determining the value of a reference colour component of the current block may include:

determining the value of the reference colour component of the current block, according to at least one of a prediction value of the reference colour component or a reconstructed value of the reference colour component corresponding to adjacent pixels of the current block.

It should be noted that, the prediction value of the reference colour component may be interpreted as "a prediction value that is determined according to the prediction mode for the reference colour component corresponding to the picture block in which the adjacent pixels are located". Here, the reconstructed value of the reference colour component may be interpreted as "the reconstructed value obtained by coding reconstruction, after obtaining the prediction value according to the prediction mode for the reference colour component corresponding to the picture block in which the adjacent pixels are located". That is, the value of the reference colour component of the current block may be determined according to the prediction value of the adjacent pixels of the current block corresponding to the reference colour component, or, may be determined according to the reconstructed value of the adjacent pixels of the current block corresponding to the reference colour component, or, may be determined according to the prediction value and the reconstructed value of the adjacent pixels of the current block corresponding to the reference colour component.

It should be noted that, the adjacent pixels of the current block may include at least one row of pixels adjacent to the current block. Alternatively, the adjacent pixels of the current block may include at least one column of pixels adjacent to the current block.

In an embodiment of the present disclosure, the reference colour component may further include one or more colour components in the reference picture. Here, the reference picture may be a picture in which a prediction reference block of the current block is located, and the one or more colour components may include at least one of the first colour component or the second colour component. Here, the reference picture may differ from the current picture in which the current block is located.

In some embodiments, the method may further include the following operations: determining motion information parameters of the current block, where the motion information parameters include a reference picture index correspondingly indicating the reference picture and a motion vector indicating the prediction reference block of the current block in the reference picture; and signaling the motion information parameter into the bitstream.

It should be noted that, for the inter prediction mode, in addition to the current picture in which the current block is located, the reference picture may be needed. Here, the reference picture index may the first branch target feature map refer to the picture index number corresponding to the reference picture, and the motion vector may be used to indicate the prediction reference block in the reference picture.

It should also be noted that, for the inter prediction mode, the reference picture index and the motion vector may be used as the inter prediction mode parameter and may be signaled into the bitstream to be transmitted from the encoder to the decoder.

Further, in some embodiments, the operation of determining the value of the reference colour component of the current block may include actions of determining, according to the prediction reference block of the current block, reference pixels; and determining, according to at least one of a prediction value or a reconstructed value of the reference pixels, the value of the reference colour component of the current block.

It should also be noted that, the reference pixels may include part or all of pixels in the prediction reference block. Alternatively, the reference pixels may also include adjacent pixels of the prediction reference block.

Here, for the adjacent pixels of the prediction reference block, the adjacent pixels of the prediction reference block may include at least one row of pixels adjacent to the prediction reference block; or, the adjacent pixels of the prediction reference block may include at least one column of pixels adjacent to the prediction reference block.

That is, after determining the prediction reference block of the current block, the reference pixels may be determined according to the prediction reference block of the current block; and then, the value of the reference colour component of the current block may be determined according to at least one of the prediction value or the reconstructed value of the reference pixels.

In this way, after obtaining the reconstructed value of the first colour component of the current block and the value of the reference colour component of the current block, the second colour component of the current block may be predicted by using the ANNM mode.

In the step of S603, the second colour component of the current block is predicted, according to the reconstructed value of the first colour component of the current block and the value of the reference colour component of the current block, to determine the prediction value of the second colour component of the current block.

It should be noted that, the first colour component may be a luma component and the second colour component may be a chroma component; or, the first colour component may be a chroma component and the second colour component may be a luma component; or, the first colour component may be a G component and the second colour component may be an R or B component; or, the first colour component may be an R component and the second colour component may be a G or B component; or, the first colour component may be a B component, the second colour component may be a G or R component, and so on. In the embodiment of the present disclosure, the first colour component may be selected to be the luma component and the second colour component may be selected to be the chroma component for illustration, which, however, is not limited in the embodiments of the present disclosure.

It should also be noted that, the ANNM mode proposed in the embodiment of the present disclosure may be implemented by using a neural network model. In the network model, a fully connected layer, a tiling operation, and a channel attention mechanism are introduced, which can improve the accuracy of the colour component prediction. In the embodiment of the present disclosure, the network model may be referred to as a network model of the ANNM mode.

In some embodiments, the operation of predicting, according to the reconstructed value of the first colour component of the current block and the value of the reference colour component of the current block, the second colour component of the current block, to determine the prediction value of the second colour component of the current block may include actions of inputting the reconstructed value of the first colour component of the current block and the value of the reference colour component of the current block into the network model of the ANNM mode, and obtaining an output result of the network model of the ANNM mode; and determining, according to the output result of the network model of the ANNM mode, the prediction value of the second colour component of the current block.

It should be noted that, the network model of the ANNM mode may be obtained through model training. In some embodiments, the operation of determining the network model of the ANNM mode may include actions of obtaining a training sample set, where the training sample set includes one or more pictures; building an initial network model, and training the initial network model by using the training sample set; and determining the trained initial network model as the network model of the ANNM mode.

It should be noted that, the training sample set may include one or more pictures. The training sample set may be a training sample set stored locally by the encoder, a training sample set obtained from a remote server according to a link or address information, or even a decoded picture sample set in a video, which, however, is not limited in the embodiments of the present disclosure.

In this way, after obtaining the training sample set, the initial network model may be trained by using the training sample set through a cost function. When a loss value (Loss)

of the cost function converges to a certain preset threshold, the trained initial network model may be the network model of the ANNM mode. Here, the cost function may be a rate-distortion cost function and the preset threshold value may be specifically set according to the actual situation, which, however, is not limited in the embodiments of the present disclosure.

It should also be noted that, for the network model of the ANNM mode, parameters of the network model can be determined firstly, and then, the network model of the ANNM mode may be built. Thus, in some embodiments, the operation of determining the network model of the ANNM mode may include actions of determining the parameters of the network model; and building the network model of the ANNM mode according to the determined parameters of the network model.

Further, the operation of determining the parameters of the network model may include: obtaining a training sample set, where the training sample set includes one or more pictures; building an initial network model, and training the initial network model by using the training sample set; and determining model parameters of the trained initial network model as the parameters of the network model.

It should be noted that, the parameters of the network model may also be determined through the model training. The parameters of the network model may be parameters of a network model structure and parameters of different layers contained in the network model structure. At this time, the parameters of the network model structure and the parameters of different layers contained in the network model structure may be signaled into the bitstream. Alternatively, the parameters of the network model may also be index parameters of the network model structure and the parameters of different layers contained in the network model structure. At this time, the index parameters of the network model structure and the parameters of different layers contained in the network model structure may be signaled into the bitstream. Alternatively, the parameters of the network model may be the index parameters of the network model. At this time, the index parameters of the network model may be signaled into the bitstream.

In this way, at the encoder side, after obtaining the parameters of the network model through the model training, the network model parameters may be signaled into the bitstream. Subsequently, the decoder may obtain the parameters of the network model directly by parsing the bitstream, and the network model of the ANNM mode can be built without performing the model training at the decoder side.

It can be understood, the network model of the ANNM mode may include a first branch network, a second branch network, and a fusion network. Specifically, in some embodiments, the operation of inputting the reconstructed value of the first colour component of the current block and the value of the reference colour component of the current block into the network model of the ANNM mode, and obtaining the output result of the network model of the ANNM mode, may include actions of inputting the value of the reference colour component of the current block into the first branch network, and obtaining a first branch target feature map; inputting the reconstructed value of the first colour component of the current block into the second branch network, and obtaining a second branch target feature map; and inputting the first branch target feature map and the second branch target feature map into the fusion network, and obtaining the output result of the network model of the ANNM mode.

It should be noted that, the network model of the ANNM mode may include two inputs: the reconstructed value of the first colour component of the current block and the value of the reference colour component of the current block. Here, the reconstructed value of the first colour component of the current block may be input into the first branch network, and the first branch target feature map may be obtained. The value of the reference colour component of the current block may be input into the second branch network, and the second branch target feature map may be obtained. Then, the first branch target feature map and the second branch target feature map may be input into the fusion network, such that the output result of the network model of the ANNM mode may be obtained.

Figure 7:
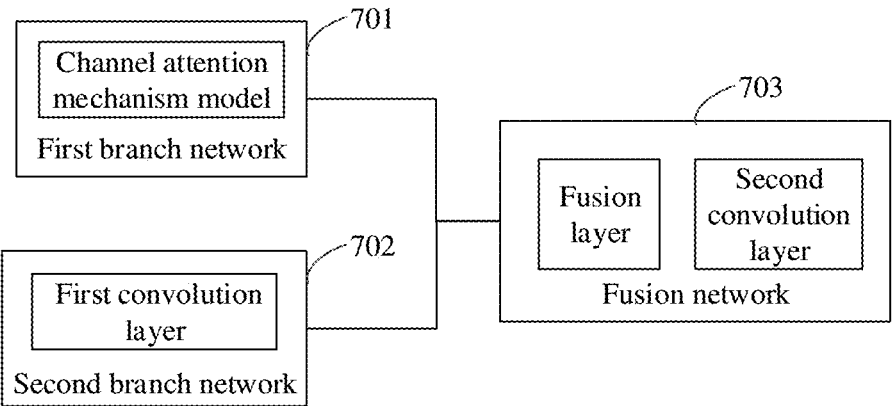
FIG. 7 illustrates a block diagram of a network model of an ANNM mode according to an embodiment of the present disclosure.

Exemplarily, FIG. 7 illustrates a block diagram of a network model of an ANNM mode according to an embodiment of the present disclosure. As shown in FIG. 7, a network model 70 of the ANNM mode may include a first branch network 701, a second branch network 702 and a fusion network 703. The reconstructed value of the first colour component of the current block may be input into the first branch network 701; the value of the reference colour component of the current block may be input into the second branch network 702; and then, the outputs of the two branch networks may be input into the fusion network 703, so as to obtain the output result of the network model of the ANNM mode.

In an embodiment of the present disclosure, the first branch network 701 may at least include a channel attention mechanism model, the second branch network 702 may at least include a first convolution layer, and the fusion network 703 may at least include a fusion layer and a second convolution layer.

Here, a convolution kernel of the first convolution layer may differ from that of the second convolution layer. The convolution kernel size of the first convolution layer may be 3×3, and the convolution kernel size of the second convolution layer may be 1×1.

It should also be noted that, in addition to the channel attention mechanism model, the first branch network 701 may further include at least one of following network layers: a sampling rate conversion layer, a concatenation layer, a fully connected layer, or a tiling operation layer. Here, the sampling rate conversion layer may be used for performing a downsampling processing, e.g., predicting a chroma component according to a luma component; or, the sampling rate conversion layer may be used for performing an upsampling processing, e.g., predicting a luma component according to a chroma component. The embodiments of the present disclosure are not limited thereto.

In some embodiments, the value of the reference colour component of the current block may include a value of the first colour component and a value of the second colour component. The operations of inputting the value of the reference colour component of the current block into the first branch network, and obtaining the first branch target feature map may include actions of performing, through the sampling rate conversion layer, sampling rate conversion on the value of the first colour component, to obtain a value of the sampling-rate converted first colour component; concatenating, through the concatenation layer, the value of the sampling-rate converted first colour component with the value of the second colour component, to obtain a concatenation result; performing, through the fully connected layer, a full connection operation on the concatenation result, to obtain a first feature map; performing, through the tiling operation layer, a tiling operation on the first feature map, to obtain a plurality of second feature maps; and redistributing, through the channel attention mechanism model, channel weights for the plurality of second feature maps, to obtain the first branch target feature map.

That is, the reference colour component of the current block may be in a sampling format of 4:2:0. Assuming that the first colour component is the luma component and the second colour component is the chroma component, a down-sampling-rate processing with a factor of 2 may need to be performed on the value of the first colour component, such that the size of the luma component may be the same as that of the chroma component. Then, the value of the down-sampled first colour component and the value of the second colour component may be concatenated on a channel, and then, a group of feature maps with a size of 128×1 may be obtained through the fully connected layer. Next, the tiling operation may be performed on the feature maps, that is, each pixel may be expanded into a feature map with a size of 64×64, and a group of feature maps with a size of 64×64×128 may be obtained. The features of the reference colour component may be fully extracted through the fully connected layer and the tiling operation, and the reference colour component may be transformed into a group of feature maps suitable for a convolution operation. Finally, the group of feature maps with the size of 64×64×128 may be input into the channel attention mechanism model, to redistribute a weight to each channel of the input feature maps. That is, the final output of the channel attention mechanism model may be the feature map with the size of 64×64×128 and the redistributed channel weights. Here, the introduced channel attention mechanism model may further explore the relationship between the reference colour component and the colour component to be predicted (i.e., the chroma component) of the current block, thereby, improving the prediction accuracy of the chroma component.

In some embodiments, the operation of inputting the reconstructed value of the first colour component of the current block into the second branch network, and obtaining the second branch target feature map, may include actions of performing, through the at least one first convolution layer, a convolution operation on the reconstructed value of the first colour component of the current block, to obtain the second branch target feature map.

It should be noted that, the input of the second branch network may be the reconstructed value of the first colour component of the current block, the second branch network may include three first convolution layers, and a convolution kernel size of the first convolution layer may be 3×3. That is, the reconstructed value of the first colour component of the current block may pass through the convolution layer with the convolution kernel size of 3×3 for three times in turn, such that the second branch target feature map may be obtained.

Here, assuming that the size of the current block is 128×128, the second branch target feature map with the size of 64×64×128 may be obtained after performing the convolution operation with the convolution kernel size of 3×3 for three times in turn.

In some embodiments, the operations of inputting the first branch target feature map and the second branch target feature map into the fusion network, and obtaining the output result of the network model of the ANNM mode may include actions of performing, through the fusion feature map, an addition operation on each pair of correspondingly located elements in the first branch target feature map and the second branch target feature map, to obtain a fused feature map; and performing, through the at least one second convolution layer, a convolution operation on the fused feature map, to obtain the output result of the network model of the ANNM mode.

It should be noted that, the input of the fusion network may be the first branch target feature map and the second branch target feature map, the fusion network may include two second convolution layers, and the convolution kernel size of the second convolution layer may be 1×1. That is, after obtaining the fusion feature map, the fusion feature map may pass through the convolution layer with the convolution kernel size of 1×1 for twice in turn, and may finally obtain the output result of the network model of the ANNM mode.

Here, assuming that the size of the first branch target feature map is 64×64×128 and the size of the second branch target feature map is 64×64×128, an addition operation may be performed, through the fusion layer, on each pair of correspondingly located elements in the first branch target feature map and in the second branch target feature map, to obtain a fused feature map still with a size of 64×64×128. After performing the convolution operation with the kernel size of 1×1 twice in turn, the output result of the network model of the ANNM mode may be obtained finally.

Further, in some embodiments, the operation of determining, according to the output result of the network model of the ANNM mode, the prediction value of the second colour component of the current block, may include setting the prediction value of the second colour component of the current block to be equal to the output result of the network model of the ANNM mode.

Alternatively, the operation of determining, according to the output result of the network model of the ANNM mode, the prediction value of the second colour component of the current block, may include actions of filtering the output result of the network model of the ANNM mode, to obtain a first filtered value; and setting the prediction value of the second colour component of the current block to be equal to the first filtered value.

That is, after obtaining the output result of the network model of the ANNM mode, in a possible implementation, the prediction value of the second colour component of the current block may be directly set to be equal to the output result of the network model of the ANNM mode. In another possible implementation, the output result of the network model of the ANNM mode may be filtered, and then, the prediction value of the second colour component of the current block may be set to be equal to the first filtered value that is obtained. Here, the filter processing may be an upsampling-filtering processing, a downsampling-filtering processing, or even a low-pass filtering processing. For example, the filtering process may be performed by using a low-pass filter, such as, a neural network filter or the like, which is not limited in the embodiments of the present disclosure.

In the embodiment of the present disclosure, the technical solution of the present disclosure provides an ANNM mode, which is a neural network model based on channel attention mechanism and can be used for the prediction of the colour components of the CTU/CU. The core point of the ANNM mode lies in that the fully connected layer, the tiling operation, and the channel attention mechanism model are introduced. Here, by introducing the fully connected layer and the tiling operation, the features of the reference colour component can be fully extracted, and after performing one tiling operation, sizes of the group of features can be transformed into feature sizes suitable for the convolution operation, which can be beneficial to subsequent convolution operations. By introducing the channel attention mecha-nism model, the channel attention mechanism model may act on the reference colour component of the reference CU. By using the channel attention mechanism model, the weights may be redistributed to the channels for the refer-ence colour component of the reference CU, such that the relationship between the reference colour component and the colour component to be predicted can be better explored, and the prediction accuracy of the colour component to be predicted can be improved.

In addition, in an embodiment of the present disclosure, the current block may be a CU with different sizes, such as, a size of 64×64, 32×32, 16×16 and 8×8, or a CTU with different sizes, such as, a size of 128×128, but the size of 128×128 may also be regarded as a CU with the largest size. Here, the network model with different network structures may be designed for the CU with different sizes. Theoreti-cally, the smaller the size of CU, the less features of the CU, and the network model designed at this time can be simpler. Additionally, in the design of the network model of the ANNM mode, a more lightweight network structure may be attempted to be introduced to predict the colour component, so as to further improve the coding efficiency.

The embodiments provide a picture prediction method. The prediction mode parameter of the current block is determined; the reconstructed value of the first colour com-ponent of the current block and the value of the reference colour component of the current block are determined, in response to the prediction mode parameter indicating deter-mining the prediction value of the current block by using the attention-mechanism-based artificial neural network model (ANNM) mode; and the second colour component of the current block is predicted by using the ANNM mode accord-ing to the reconstructed value of the first colour component of the current block and the value of the reference colour component of the current block, to determine the prediction value of the second colour component of the current block. Therefore, the present disclosure proposes predicting the colour components of the current block by using an ANNM mode, which fully considers a relationship between the first colour component and the reference colour component of the current block, such that a more accurate prediction value of the second colour component can be obtained by using the ANNM mode, which can not only improve the accuracy of the colour component prediction, but also reduce the number of bits to be transmitted, thereby reducing the bitrate and further improving the coding efficiency.

In another embodiment of the present disclosure, a spe-cific application scenario may be: assuming that the first colour component is the luma component (Y component), and the second colour component is the chroma component (U component or V component), the reference colour com-ponent may be the YUV component, and the Y component may be used to perform a chroma intra prediction for the U component or V component of the current block. The picture prediction method of the embodiment of the present disclo-sure will be described in detail in such application scenario.

In an embodiment of the present disclosure, the ANNM mode may be used as the chroma intra prediction mode for the current block with an unlimited size. Since the fully connected layer, the tiling operation and the channel atten-tion mechanism model are introduced into the network model of the ANNM mode, the prediction accuracy of the chroma component can be improved. In the encoder, the ANNM mode, as a new chroma intra prediction mode, may compete with the existing chroma intra prediction mode in VVC. The specific flow may be as follows.

The chroma intra prediction modes may be classified into the existing chroma intra prediction mode in VVC and the ANNM mode. When performing the chroma intra prediction mode, 1-bit mode flag bit may be used to mark the prediction mode that is finally selected by the current block. If the ANNM mode is selected, the mode flag bit may be 1; or, if the existing chroma intra prediction mode in VVC is selected, the mode flag bit may be 0. Then, the 1-bit mode flag bit may be signaled into the bitstream and transmitted to the decoder, used to be decoded by the decoder.

Specifically, when performing the ANNM mode, it may be necessary to obtain the reconstructed Y component of the current block and the reconstructed YUV component of the adjacent reference pixels (N columns of reference pixels on the left side and/or N rows of reference pixels on the upper side). The two components may be input into the network model of the ANNM mode, to obtain the predicted U component or V component. Next, MSE calculation may be performed according to the prediction value and the true value, to obtain the distortion value (D1), where the bitrate (R1) is 1, and then the rate-distortion cost result (RDC1) in the ANNM mode may be obtained by the calculation based on D1+λR1. Then, the RDC1 may be compared with an optimal rate-distortion cost result (RDC2) obtained by the existing target chroma intra prediction mode in VVC, to select the optimal rate-distortion cost thereof. A final chroma prediction mode for the current block may be obtained.

Figure 8:
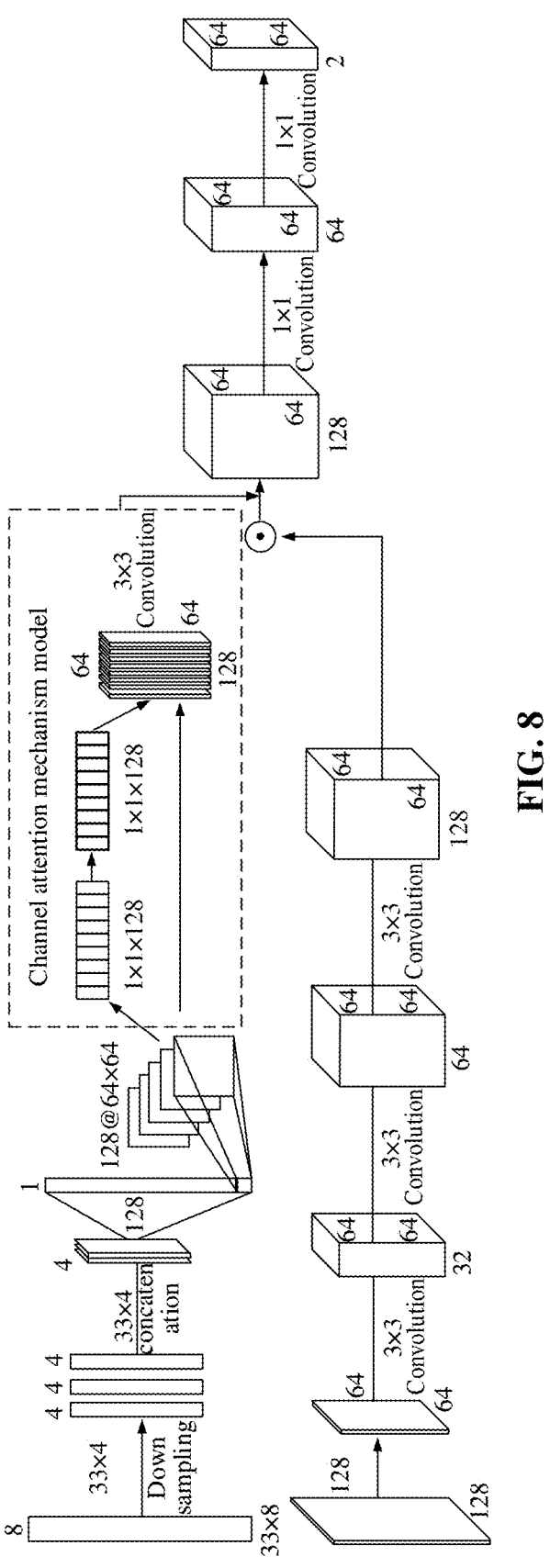
FIG. 8 illustrates a schematic diagram of a specific network structure of a network model of an ANNM mode according to an embodiment of the present disclosure.
Figure 9:
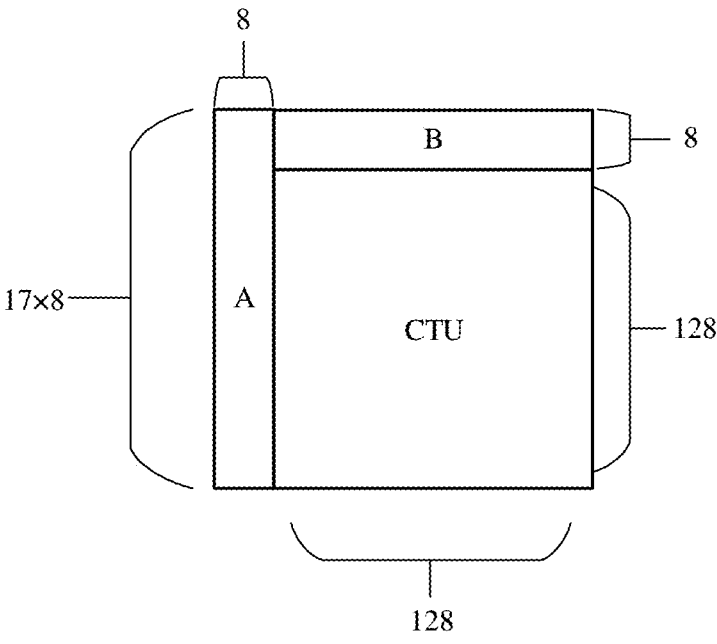
FIG. 9 illustrates a schematic diagram of a position relationship between a CTU and reference pixels adjacent to an upper/left side of the CTU according to an embodiment of the disclosure.

It should be noted that, a core innovation of the technical solution of the present disclosure lies in the design of the neural network model based on the attention mechanism. Taking a network model for a CTU with a size of 128×128 as an example, as shown in FIG. 8, FIG. 8 illustrates a schematic diagram of a specific network structure of a network model of an ANNM mode according to an embodi-ment of the present disclosure. The network model may have two inputs, i.e., the Y component of the CTU with a current size of 128×128, and the YUV component of 8 rows of adjacent reference pixels on the upper side and 8 columns of adjacent reference pixels on the left side. As shown in FIG. 9, FIG. 9 illustrates a schematic diagram of a position relationship between a CTU and adjacent reference pixels according to an embodiment of the disclosure. Here, the 8 columns of adjacent reference pixels on the left side are located on the left side of the CTU (denoted by A), and the 8 rows of adjacent reference pixels on the upper side are located on the upper side of the CTU (denoted by B).

Here, the network model of the ANNM mode may have two branch networks and a fusion network. The upper branch of the network model may be the first branch network, and the input of the upper branch may be the YUV component of the reference pixels. Since the YUV format here is 4:2:0, a downsampling processing with a factor of 2 may be firstly performed on the Y component, such that the size of the Y component may be the same as that of the UV component. The sampled Y component and the UV compo-nent may be concatenated on the channel, and then pass through the fully connected layer, to obtain a group of feature maps with a size of 128×1. Next, the tiling operation may be performed on the group of the feature maps, to obtain a group of feature maps with a size of 64×64×128. Finally, the group of feature maps may be input into the channel attention mechanism model, to redistribute the channel weight for the YUV reference feature map and further to obtain the first branch target feature map. The lower branch of the network model may be the second branch network, and the input of the lower branch may be the Y component of the current CTU. The input Y component of the current CTU may pass through the convolution layer with a kernel size of 3×3 for three times in turn. Then, a feature map with a size of 64×64×128, i.e., the second branch target feature map may be obtained. Feature fusion may be performed on the feature map of the upper branch and the feature map of the lower branch by performing an addition operation on each pair of correspondingly located elements in the feature map of the upper branch and in the feature map of the lower branch. Next, the feature map may pass through a convolution layer with a kernel size of 1×1 for twice in turn, to finally obtain the predicted U component or V component.

It should also be noted that, for the fully connected layer and the tiling operation, specifically, the reference YUV component with a size of 64×64×3 may pass through the fully connected layer, to obtain a group of feature maps with a size of 128×1. Then, the tiling operation may be performed on the group of feature maps, that is, each pixel may be expanded to a feature map with a size of 64×64, and thus, a group of feature maps with the size of 64×64×128 can be obtained. By such operation, the features of the reference YUV component can be fully extracted, and the reference YUV component can be transformed into a group of features suitable for the convolution operation. That is, by introducing the fully connected layer and the tiling operation, the features of the reference YUV component can fully extracted, and after performing one tiling operation, the size of the group of features can be transformed into a feature size suitable for the convolution operation, which can be beneficial to the subsequent convolution operations.

Figure 10:
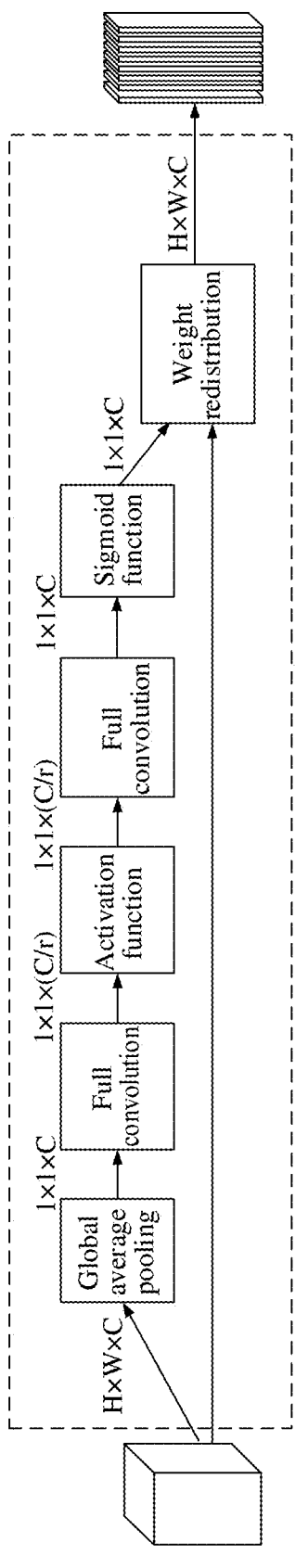
FIG. 10 illustrates a schematic diagram of a specific network structure of a channel attention mechanism model according to an embodiment of the present disclosure.

It should also be noted that, for the channel attention mechanism model, as shown in FIG. 10, specifically, the network structure of the channel attention mechanism model can also be refer to as a squeeze-and-exception network (SE-Net). In an embodiment of the present disclosure, the channel attention mechanism model may be embedded into the first branch network in the ANNM mode, and the input may be the feature map of the reference YUV component with a size of 64×64×128 subjected to the tiling operation, where 64×64 is the size of the feature map and 128 is the number of channels. Here, by performing the Squeeze operation, i.e., global average pooling, a feature map with a size of H×W and a channel number of C may be transformed into a feature map with a size of 1×1×C, to better explore the correlation in the channel. By performing an activation (Excitation) operation, i.e., passing through two fully convolutions (FC) sequentially, and finally passing through a Sigmoid function, the feature map with the size of 1×1×C can be obtained, the sum of all elements of the feature map may be 1, C elements of the feature map may be taken as weights for the C channels of the feature map that is original input, and each channel of the input feature map may be redistributed with a weight (scale). Here, in FIG. 10, the activation function may be a rectified linear unit (ReLU), which may also be referred to as a modified linear unit. The modified linear unit is a commonly used activation function in artificial neural networks, and often refers to a nonlinear function represented by a ramp function and its variants. In addition, the Sigmoid function is a common S-type function, which may also be refer to as a Logistic function. Because of properties of monotone increasing property of the Sigmoid function and monotone increasing property of the inverse function of the Sigmoid function, the Sigmoid function may be often used as the activation function of the neural network and used for mapping variables to 0~1.

In this way, the final output of the channel attention mechanism model may the feature map of the reference YUV component with the size of 64×64×128 which is redistributed with the channel weights. That is, the introduced channel attention mechanism model may mainly act on the reference YUV component. By using the channel attention mechanism model, the reference YUV component may be redistributed with the channel weights, and the relationship between the reference YUV component and the U component or V component to be predicted can be better explored, and the prediction accuracy of the U component or V component can be improved.

It can be understood that, the network model described in the embodiment of the present disclosure may be only used for the chroma prediction for the CTU with a size of 128×128, which is similar to the network structure of the chroma prediction for the CU with a size of 64×64, 32×32, 16×16, and 8×8. The only difference lies in the different number of the reference pixels, which may cause a difference of the fully connected layer. Specifically, the CU with the size of 64×64 may select four columns of adjacent pixels on the left side and four rows of adjacent pixels on the upper side as the reference pixels. The CU with the size of 32×32, 16×16 and 8×8 may select two columns of adjacent pixels on the left side and two rows of adjacent pixels on the upper side as the reference pixels.

In an embodiment of the present disclosure, for colour component prediction, in order to reduce the redundancy between the luma component and the chroma component, the CCLM in VVC adopts a linear model to describe the relationship between the luma component and the chroma component, which causes the low prediction accuracy and thus losing the coding efficiency. Based on this, an attention based-neural network structure, i.e., the network model of the ANNM mode, is introduced in the embodiment of the present disclosure, and a nonlinear model is used to describe the relationship between the luma component and the chroma component, thus improving the prediction accuracy between different colour components and further improving the overall coding efficiency of the encoder.

The embodiment provides the picture prediction method. The implementation of the aforementioned embodiments has been specifically described through the embodiment above. It can be seen that the technical solution of the present disclosure can greatly reduce the bitrate and improve the coding efficiency. In order to predict the chroma component of the current CTU, the adjacent reference pixels on the upper side and the adjacent reference pixels on the left side of the current CTU or CU can be used. By using the channel attention mechanism and the fully connected layer, the relationship between the Y component and the reference YUV component of the current CTU can be fully explored, such that the chroma component can be predicted more accurately, and the difference between the reconstructed value and the true value can be reduced, thus reducing the number of bits to be transmitted, and improving the coding efficiency.

In a further embodiment of the present disclosure, the picture prediction method according to the embodiment of the present disclosure may be applied to a video decoding apparatus, i.e. a decoder. The functions realized by the method can be realized by calling a computer program by a second processor in the decoder. Of course, the computer program can be stored in a second memory. It can be seen that the decoder includes at least the second processor and the second memory.

Figure 11:
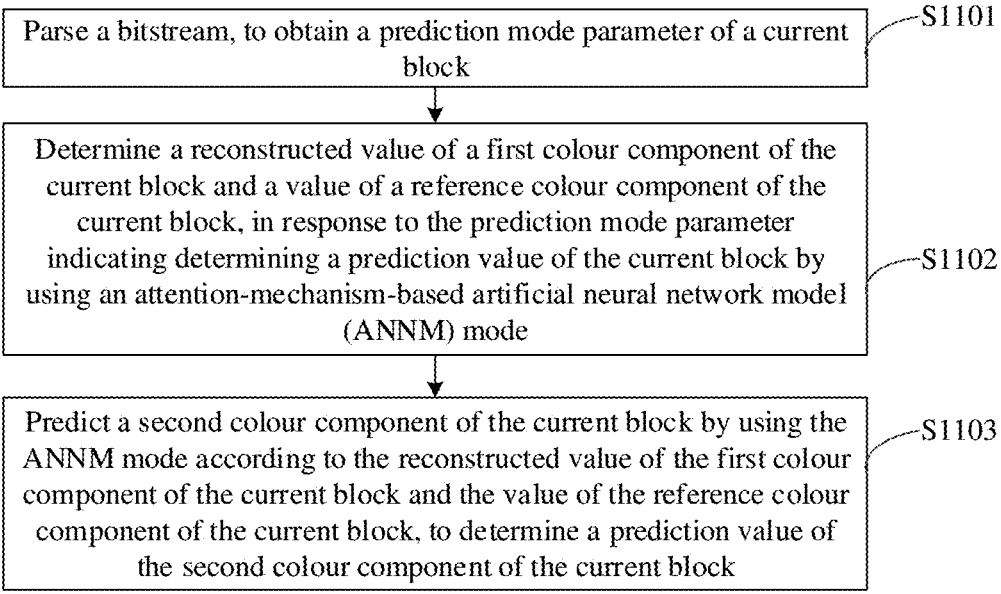
FIG. 11 illustrates a flow chart of another picture prediction method according to an embodiment of the present disclosure.

Based on the application scenario example shown in FIG. 5B, FIG. 11 illustrates a flow chart of another picture prediction method according to an embodiment of the present disclosure. As shown in FIG. 11, the method includes the following steps of S1101 to S1103.

In the step of S1101, a bitstream is parsed, to obtain a prediction mode parameter of a current block.

It should be noted that, the video picture can be divided into a plurality of picture blocks, and each current picture block to be decoded can be called as a decoding block. Here, each decoding block may include a first colour component, a second colour component and a third colour component. A current block may be a decoding block in the video picture, of which the first colour component, the second colour component, or the third colour component is to be predicted currently.

In some embodiments, the operation of parsing the bitstream, to obtain the prediction mode parameter of the current block may include actions of parsing the bitstream, to obtain a mode flag bit for the current block, where the mode flag bit is configured to indicate a prediction mode to be used by the current block; and determining, according to the mode flag bit, the prediction mode parameter of the current block.

Further, the operations of determining, according to the mode flag bit, the prediction mode parameter of the current block may include actions of determining the prediction mode parameter of the current block to indicate that the ANNM mode is to be used by the current block, in response to the mode flag bit being a first value; and determining the prediction mode parameter of the current block to indicate that the ANNM mode is not to be used by the current block, in response to the mode flag bit being a second value.

It should be noted that, in one possible implementation, the first value may be 1 and the second value may be 0; or, the first value may be "true" and the second value may be "false". In another possible implementation, the first value may be 0 and the second value may be 1; or, the first value may be "false" and the second value may be "true".

It should also be noted that, after determining the prediction mode parameter, the encoder may signal the mode flag bit into the bitstream. Thus, the decoder may obtain the mode flag bit for the current block by parsing the bitstream, and then, determine the prediction mode parameter of the current block according to the mode flag bit.

Exemplarily, assuming that the chroma component is predicted from the luma component, the mode flag bit for the chroma prediction mode may be firstly decoded from the bitstream. If the mode flag bit is 1, the ANNM mode may be used to reconstruct the chroma component of the current block; or, if the mode flag bit is 0, the existing optimal chroma prediction mode in VVC may be used to reconstruct the chroma component of the current block.

In some embodiments, the operations of parsing the bitstream, to obtain the prediction mode parameter of the current block may include actions of parsing the bitstream, to obtain a mode index number for the current block, where the mode index number is configured to indicate a prediction mode to be used by the current block; and determining, according to the mode index number, the prediction mode parameter of the current block.

Further, the operations of determining, according to the mode index number, the prediction mode parameter of the current block may include actions of determining the prediction mode parameter of the current block to indicate that the ANNM mode is to be used by the current block, in response to a value of the mode index number being equal to an index number corresponding to using the ANNM mode; and determining the prediction mode parameter of the current block to indicate that the ANNM mode is not to be used by the current block, in response to the value of the mode index number being not equal to the index number corresponding to using the ANNM mode.

It should be noted that, after determining the prediction mode parameter, the encoder may also signal the mode index number into the bitstream. Thus, the decoder may obtain the mode index number of the current block by parsing the bitstream, and then determine the prediction mode parameter of the current block according to the mode index number.

In the step of S1102, a reconstructed value of a first colour component of the current block and a value of a reference colour component of the current block are determined, in response to the prediction mode parameter indicating determining a prediction value of the current block by using an attention-mechanism-based artificial neural network model (ANNM) mode.

It should be noted that, when the prediction mode parameter indicates determining the prediction value of the current block by using the ANNM mode, the reconstructed value of the first colour component of the current block and the value of the reference colour component of the current block may be obtained.

In an embodiment of the present disclosure, the reference colour component may include one or more colour components in the current picture. Here, the current picture may refer to a picture in which the current block is located, and the one or more colour components may include at least one of the first colour component or the second colour component.

In some embodiments, the operation of determining the value of the reference colour component of the current block may include determining the value of the reference colour component of the current block, according to at least one of a prediction value of the reference colour component or a reconstructed value of the reference colour component corresponding to adjacent pixels of the current block.

It should be noted that, the adjacent pixels of the current block may include at least one row of pixels adjacent to the current block. Alternatively, the adjacent pixels of the current block may include at least one column of pixels adjacent to the current block.

In an embodiment of the present disclosure, the reference colour component may further include one or more colour components in the reference picture. Here, the reference picture may be a picture in which a prediction reference block of the current block is located, and the one or more colour components may include at least one of the first colour component or the second colour component. Here, the reference picture may differ from the current picture in which the current block is located.

In some embodiments, the method may further include operations of: parsing the bitstream, to obtain motion information parameters of the current block, where the motion information parameters include a motion vector and a reference picture index; determining, according to the reference picture index, the reference picture of the current block; and determining, according to the motion vector, the prediction reference block of the current block in the reference picture.

It should be noted that, the reference picture index may refer to the picture index number corresponding to the reference picture, and the motion vector may be used to indicate the prediction reference block in the reference picture. Thus, for the inter prediction mode, in addition to the current picture in which the current block is located, the prediction reference block may need to be determined. Here, by parsing the bitstream, the motion vector and the reference picture index may be obtained; and then, the reference picture of the current block may be determined according to the reference picture index. Then, the prediction reference block of the current block may be determined in the reference picture according to the motion vector.

Further, in some embodiments, the operation of determining the value of the reference colour component of the current block may include actions of determining, according to the prediction reference block of the current block, reference pixels; and determining, according to at least one of a prediction value or a reconstructed value of the reference pixels, the value of the reference colour component of the current block.

It should be noted that, the reference pixels may include part or all of pixels in the prediction reference block. Alternatively, the reference pixels may also include adjacent pixels of the prediction reference block.

Here, for the adjacent pixels of the prediction reference block, the adjacent pixels of the prediction reference block may include at least one row of pixels adjacent to the prediction reference block; or, the adjacent pixels of the prediction reference block may further include at least one column of pixels adjacent to the prediction reference block.

That is, after determining the prediction reference block of the current block, the reference pixel may be determined according to the prediction reference block of the current block; and then, the value of the reference colour component of the current block may be determined according to at least one of the prediction value of the reference pixel or the reconstructed value of the reference pixel.

In this way, after obtaining the reconstructed value of the first colour component of the current block and the value of the reference colour component of the current block, the second colour component of the current block may be predicted by using the ANNM mode.

In the step of S1103, a second colour component of the current block is predicted by using the ANNM mode according to the reconstructed value of the first colour component of the current block and the value of the reference colour component of the current block, to determine a prediction value of the second colour component of the current block.

It should be noted that, the first colour component may be a luma component and the second colour component may be a chroma component; or, the first colour component may be a chroma component and the second colour component may be a luma component; or, the first colour component may be a G component and the second colour component may be an R or B component; or, the first colour component may be an R component and the second colour component may be a G or B component; or, the first colour component may be a B component, the second colour component may be a G or R component, and so on. In the embodiment of the present disclosure, the first colour component may be selected to be the luma component and the second colour component may be selected to be the chroma component for illustration, but the embodiments of the present disclosure are not limited.

It should also be noted that, the ANNM mode proposed in the embodiment of the present disclosure may be implemented by using a neural network model. In the network model, a fully connected layer, a tiling operation, and a channel attention mechanism are introduced, which can improve the accuracy of the colour component prediction. In the embodiment of the present disclosure, the network model may be referred to as a network model of the ANNM mode.

In some embodiments, the operation of predicting, according to the reconstructed value of the first colour component of the current block and the value of the reference colour component of the current block, the second colour component of the current block by using the ANNM mode, to determine the prediction value of the second colour component of the current block may include actions of inputting the reconstructed value of the first colour component of the current block and the value of the reference colour component of the current block into the network model of the ANNM mode, and obtaining an output result of the network model of the ANNM mode; and determining, according to the output result of the network model of the ANNM mode, the prediction value of the second colour component of the current block.

It should be noted that, the network model of the ANNM mode may be obtained through model training. In some embodiments, the operation of determining the network model of the ANNM mode may include actions of obtaining a training sample set, where the training sample set includes one or more pictures; building an initial network model, and training the initial network model by using the training sample set; and determining the trained initial network model as the network model of the ANNM mode.

It should be noted that, the training sample set may include one or more pictures. The training sample set may be a training sample set stored locally by the encoder, a training sample set obtained from a remote server according to a link or address information, or even a decoded picture sample set in a video, but the embodiments of the present disclosure are not specifically limited.

It should also be noted that, for the network model of the ANNM mode, parameters of the network model can be determined firstly, and then, the network model of the ANNM mode may be built. Thus, in a possible implementation, the operations of determining the network model of the ANNM mode may include actions of determining the parameters of the network model; and building the network model of the ANNM mode according to the determined parameters of the network model.

In an embodiment of the present disclosure, the parameters of the network model may be determined through the model training Specifically, the operations of determining the parameters of the network model may include: obtaining a training sample set, where the training sample set includes one or more pictures; building an initial network model, and training the initial network model by using the training sample set; and determining model parameters of the trained initial network model as the parameters of the network model.

In another possible implementation, the operation of determining the network model of the ANNM mode may include actions of: parsing the bitstream, to obtain the parameters of the network model; and building the network model of the ANNM mode according to the parameters of the network model.

In the embodiment of the present disclosure, after obtaining the parameters of the network model through the model training, the encoder may directly signal the parameters of the network model into the bitstream. Therefore, the decoder may obtain the parameters of the network model directly by parsing the bitstream, and build the preset network model without the model training. Here, in a specific implementation, the parameters of the network model may be parameters of a network model structure and parameters of different layers contained in the network model structure. At this time, the bitstream may be parsed to obtain the parameters of the network model structure, and the network model structure may be determined according to the parameters of the network model structure. The bitstream may further be parsed to obtain the parameters of different layers contained in the network model structure, so as to build the network model of the ANNM mode. In another specific implementation, the parameters of the network model may also be index parameters of the network model structure and the parameters of different layers contained in the network model structure. At this time, the bitstream may be parsed to obtain the index parameters of the network model structure, and the network model structure corresponding to the index parameters may be determined. The bitstream may be parsed to obtain the parameters of different layers contained in the network model structure, so as to build the network model of the ANNM mode. In a further specific implementation, the parameters of the network model may also be the index parameters of the network model. At this time, the bitstream may be parsed to obtain the index parameters of the network model, and the network model corresponding to the index parameters may be determined, so as to build the network model of the ANNM mode.

It can be understood, the network model of the ANNM mode may include a first branch network, a second branch network, and a fusion network. Specifically, in some embodiments, the operations of inputting the reconstructed value of the first colour component of the current block and the value of the reference colour component of the current block into the network model of the ANNM mode, and obtaining the output result of the network model of the ANNM mode, may include actions of inputting the value of the reference colour component of the current block into the first branch network, and obtaining a first branch target feature map; inputting the reconstructed value of the first colour component of the current block into the second branch network, and obtaining a second branch target feature map; and inputting the first branch target feature map and the second branch target feature map into the fusion network, and obtaining the output result of the network model of the ANNM mode.

It should be noted that, the network model of the ANNM mode may include two inputs: the reconstructed value of the first colour component of the current block and the value of the reference colour component of the current block. Here, the reconstructed value of the first colour component of the current block may be input into the first branch network, and the first branch target feature map may be obtained. The value of the reference colour component of the current block may be input into the second branch network, and the second branch target feature map may be obtained. Then, the first branch target feature map and the second branch target feature map may be input into the fusion network, such that the output result of the network model of the ANNM mode may be obtained.

In an embodiment of the present disclosure, the first branch network may at least include a channel attention mechanism model, the second branch network may at least include a first convolution layer, and the fusion network may at least include a fusion layer and a second convolution layer.

Here, a convolution kernel of the first convolution layer may differ from that of the second convolution layer. The convolution kernel size of the first convolution layer may be 3×3, and the convolution kernel size of the second convolution layer may be 1×1.

It should also be noted that, in addition to the channel attention mechanism model, the first branch network may further include at least one of following network layers: a sampling rate conversion layer, a concatenation layer, a fully connected layer, or a tiling operation layer.

In some embodiments, the value of the reference colour component of the current block may include a value of the first colour component and a value of the second colour component. The operations of inputting the value of the reference colour component of the current block into the first branch network, and obtaining the first branch target feature map may include actions of: performing, through the sampling rate conversion layer, sampling rate conversion on the value of the first colour component, to obtain a value of the sampling-rate converted first colour component; concatenating, through the concatenation layer, the value of the sampling-rate converted first colour component with the value of the second colour component, to obtain a concatenation result; performing, through the fully connected layer, a full connection operation on the concatenation result, to obtain a first feature map; performing, through the tiling operation layer, a tiling operation on the first feature map, to obtain a plurality of second feature maps; and redistributing, through the channel attention mechanism model, channel weights for the plurality of second feature maps, to obtain the first branch target feature map.

In some embodiments, the operation of inputting the reconstructed value of the first colour component of the current block into the second branch network, and obtaining the second branch target feature map, may include performing, through the at least one first convolution layer, a convolution operation on the reconstructed value of the first colour component of the current block, to obtain the second branch target feature map.

In some embodiments, the operations of inputting the first branch target feature map and the second branch target feature map into the fusion network, and obtaining the output result of the network model of the ANNM mode may include actions of: performing, through the fusion feature map, an addition operation on each pair of correspondingly located elements in the first branch target feature map and the second branch target feature map, to obtain a fused feature map; and performing, through the at least one second convolution layer, a convolution operation on the fused feature map, to obtain the output result of the network model of the ANNM mode.

Further, in some embodiments, the operation of determining, according to the output result of the network model of the ANNM mode, the prediction value of the second colour component of the current block, may include setting the prediction value of the second colour component of the current block to be equal to the output result of the network model of the ANNM mode.

Alternatively, the operation of determining, according to the output result of the network model of the ANNM mode, the prediction value of the second colour component of the current block, may include actions of: filtering the output result of the network model of the ANNM mode, to obtain a first filtered value; and setting the prediction value of the second colour component of the current block to be equal to the first filtered value.

That is, after obtaining the output result of the network model of the ANNM mode, in a possible implementation, the prediction value of the second colour component of the current block may be directly set to be equal to the output result of the network model of the ANNM mode. In another possible implementation, the output result of the network model of the ANNM mode may be filtered, and then, the prediction value of the second colour component of the current block may be set to be equal to the obtained first filtered value. Here, the filtering process may employ a low-pass filter, such as, a neural network filter or the like, but the embodiments of the present disclosure are not limited.

The embodiments provide a picture prediction method. The bitstream parsing is parsed, to obtain a prediction mode parameter of a current block; the reconstructed value of the first colour component of the current block and the value of the reference colour component of the current block are determined, in response to the prediction mode parameter indicating determining a prediction value of the current block by using an attention-mechanism-based artificial neural network model (ANNM) mode; and the second colour component of the current block is predicted by using the ANNM mode, according to the reconstructed value of the first colour component of the current block and the value of the reference colour component of the current block, to determine a prediction value of the second colour component of the current block. Therefore, the present disclosure proposes predicting the colour components of the current block by using an ANNM mode, which fully considers a relationship between the first colour component and the reference colour component of the current block, such that a more accurate prediction value of the second colour component can be obtained by using the ANNM mode, which can not only improve the accuracy of the colour component prediction, but also reduce the number of bits to be transmitted, thereby reducing the bitrate and further improving decoding efficiency.

Figure 12:
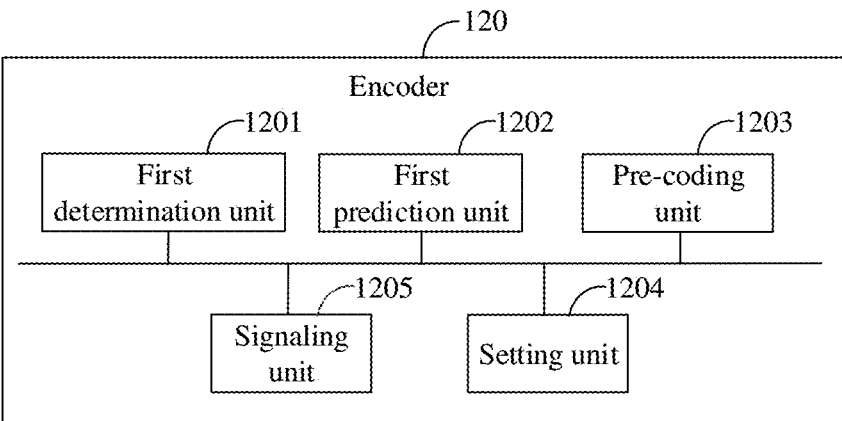
FIG. 12 illustrates a block diagram of an encoder according to an embodiment of the present disclosure.

In a further embodiment of the present disclosure, referring to FIG. 12, FIG. 12 illustrates a block diagram of an encoder according to an embodiment of the present disclosure. As shown in FIG. 12, an encoder 120 includes a first determination unit 1201 and a first prediction unit 1202.

The first determination unit 1201 is configured to determine a prediction mode parameter of a current block.

The first determination unit 1201 is further configured to determine a reconstructed value of a first colour component of the current block and a value of a reference colour component of the current block, in response to the prediction mode parameter indicating determining a prediction value of the current block by using an attention-mechanism-based artificial neural network model (ANNM) mode.

The first prediction unit 1202 is configured to predict, according to the reconstructed value of the first colour component of the current block and the value of the reference colour component of the current block, a second colour component of the current block by using the ANNM mode, to determine a prediction value of the second colour component of the current block.

In some embodiments, referring to FIG. 12, the encoder 120 may further include a pre-coding unit 1203.

The first determination unit 1201 may be further configured to determine a target prediction mode for the current block from a first candidate prediction mode set, where the first candidate prediction mode set includes one or more candidate prediction modes, and the first candidate prediction mode set does not include the ANNM mode.

The pre-coding unit 1203 may be configured to determine, based on the ANNM mode and the target prediction mode, the prediction mode parameter of the current block.

In some embodiments, the pre-coding unit 1203 may be further configured to calculate a first rate-distortion cost result of the current block based on the ANNM mode, and calculate a second rate-distortion cost result of the current block based on the target prediction mode; and select an optimal rate-distortion cost result from the first rate-distortion cost result and the second rate-distortion cost result, and determine a prediction mode corresponding to the optimal rate-distortion cost result as the prediction mode parameter of the current block.

In some embodiments, the pre-coding unit 1203 may be further configured to precode the current block by using the one or more candidate prediction modes in the first candidate prediction mode set respectively, to determine one or more pre-coding results, each corresponding to a respective one of the one or more candidate prediction modes; and determine, based on the one or more pre-coding results, the target prediction mode for the current block from the one or more candidate prediction modes.

In some embodiments, the pre-coding unit 1203 may be specifically configured to obtain, based on the one or more pre-coding results, one or more rate-distortion cost results, each corresponding to a respective one of the one or more candidate prediction modes; and select an optimal rate-distortion cost result from the one or more rate-distortion cost results, and determine a candidate prediction mode corresponding to the optimal rate-distortion cost result as the target prediction mode for the current block.

In some embodiments, the first determination unit 1201 may be configured to determine a second candidate prediction mode set, where the second candidate prediction mode set includes one or more candidate prediction modes, and the second candidate prediction mode set further includes the ANNM mode.

The pre-coding unit 1203 may be further configured to precode the current block by using the one or more candidate prediction modes in the second candidate prediction mode set respectively, to determine one or more pre-coding results, each corresponding to a respective one of the one or more candidate prediction modes; and determine, based on the one or more pre-coding results, the prediction mode parameter of the current block from the one or more candidate prediction modes.

In some embodiments, the pre-coding unit 1203 may be specifically further configured to obtain, based on the one or more pre-coding results, one or more rate-distortion cost results, each corresponding to a respective one of the one or more candidate prediction modes; and select an optimal rate-distortion cost result from the one or more rate-distortion cost results, and determine a candidate prediction mode corresponding to the optimal rate-distortion cost result as the prediction mode parameter of the current block.

In some embodiments referring to FIG. 12, the encoder 120 may further include a setting unit 1204 and a signaling unit 1205.

The setting unit 1204 may be configured to set a mode flag bit for the current block, where the mode flag bit is configured to indicate a prediction mode to be used by the current block.

The signaling unit 1205 may be configured to signal the mode flag bit into a bitstream.

In some embodiments, the setting unit 1204 may be specifically configured to set the mode flag bit to be a first value, in response to the prediction mode parameter of the current block indicating that the ANNM mode is to be used by the current block; and set the mode flag bit to be a second value, in response to the prediction mode parameter of the current block indicating that the ANNM mode is not to be used by the current block.

In some embodiments, the first value may be 1 and the second value may be 0; or, the first value may be "true" and the second value may be "false".

In some embodiments, the first value may be 0 and the second value may be 1; or, the first value may be "false" and the second value may be "true".

In some embodiments, the setting unit 1204 may be configured to set a mode index number for the current block, where the mode index number is configured to indicate a prediction mode to be used by the current block.

The signaling unit 1205 may be configured to signal the mode index into a bitstream.

In some embodiments, the setting unit 1204 may be specifically configured to set a value of the mode index to be equal to an index corresponding to using the ANNM mode, in response to the prediction mode parameter of the current block indicating that the ANNM mode is to be used by the current block; and set the value of the mode index number to be not equal to the index number corresponding to using the ANNM mode, in response to the prediction mode parameter of the current block indicating that the ANNM mode is not to be used by the current block.

In some embodiments, the reference colour component may include one or more colour components in a current picture, the current picture may be a picture in which the current block is located, and the one or more colour components may include at least one of the first colour component or the second colour component.

In some embodiments, the first determination unit 1201 may be specifically configured to determine the value of the reference colour component of the current block, according to at least one of a prediction value of the reference colour component or a reconstructed value of the reference colour component corresponding to adjacent pixels of the current block.

In some embodiments, the adjacent pixels of the current block may include at least one row of pixels adjacent to the current block.

In some embodiments, the adjacent pixels of the current block may include at least one column of pixels adjacent to the current block.

In some embodiments, the reference colour component may include one or more colour components in a reference picture, the reference picture may be a picture in which a prediction reference block of the current block is located, and the one or more colour components may include at least one of the first colour component or the second colour component.

In some embodiments, the first determination unit 1201 may further be configured to determine motion information parameters of the current block, where the motion information parameters include a reference picture index correspondingly indicating the reference picture and a motion vector indicating the prediction reference block of the current block in the reference picture.

The signaling unit 1205 may be configured to signal the motion information parameter into a bitstream.

In some embodiments, the first determination unit 1201 may be specifically configured to determine reference pixels according to the prediction reference block of the current block, and determine the value of the reference colour component of the current block, according to at least one of a prediction value or a reconstructed value of the reference pixels.

In some embodiments, the reference pixels may include part or all of pixels in the prediction reference block.

In some embodiments, the reference pixels may include adjacent pixels of the prediction reference block.

In some embodiments, the adjacent pixels of the prediction reference block may include at least one row of pixels adjacent to the prediction reference block.

In some embodiments, the adjacent pixels of the prediction reference block may include at least one column of pixels adjacent to the prediction reference block.

In some embodiments, the first prediction unit 1202 may be specifically configured to input the reconstructed value of the first colour component of the current block and the value of the reference colour component of the current block into a network model of the ANNM mode, and obtain an output result of the network model of the ANNM mode; and determine, according to the output result of the network model of the ANNM mode, the prediction value of the second colour component of the current block.

In some embodiments, the network model of the ANNM mode may include a first branch network, a second branch network, and a fusion network.

The first branch network may at least include a channel attention mechanism model, the second branch network may at least include a first convolution layer, and the fusion network may at least include a fusion layer and a second convolution layer, where a convolution kernel of the first convolution layer differs from a convolution kernel of the second convolution layer.

In some embodiments, the first branch network may further include at least one of following network layers: a sampling rate conversion layer, a concatenation layer, a fully connected layer, or a tiling operation layer.

In some embodiments, the first prediction unit 1202 may be further configured to input the value of the reference colour component of the current block into the first branch network, and obtain a first branch target feature map; input the reconstructed value of the first colour component of the current block into the second branch network, and obtain a second branch target feature map; and input the first branch target feature map and the second branch target feature map into the fusion network, and obtain the output result of the network model of the ANNM mode.

In some embodiments, the value of the reference colour component of the current block may include a value of the first colour component and a value of the second colour component.

The first prediction unit 1202 may be specifically configured to perform, through the sampling rate conversion layer, sampling rate conversion on the value of the first colour component, to obtain a value of the sampling-rate converted first colour component; concatenate, through the concatenation layer, the value of the sampling-rate converted first colour component with the value of the second colour component, to obtain a concatenation result; perform, through the fully connected layer, a full connection operation on the concatenation result, to obtain a first feature map; perform, through the tiling operation layer, a tiling operation on the first feature map, to obtain a plurality of second feature maps; and redistribute, through the channel attention mechanism model, channel weights for the plurality of second feature maps, to obtain the first branch target feature map.

In some embodiments, the first prediction unit 1202 may be specifically configured to perform, through the at least one first convolution layer, a convolution operation on the reconstructed value of the first colour component of the current block, to obtain the second branch target feature map.

In some embodiments, the first prediction unit 1202 may be specifically configured to perform, through the fusion feature map, an addition operation on each pair of correspondingly located elements in the first branch target feature map and the second branch target feature map, to obtain a fused feature map; and perform, through the at least one second convolution layer, a convolution operation on the fused feature map, to obtain the output result of the network model of the ANNM mode.

In some embodiments, the first prediction unit 1202 may be specifically configured to set the prediction value of the second colour component of the current block to be equal to the output result of the network model of the ANNM mode.

In some embodiments, the first prediction unit 1202 may be specifically configured to filter the output result of the network model of the ANNM mode, to obtain a first filtered value; and set the prediction value of the second colour component of the current block to be equal to the first filtered value.

In some embodiments, the first colour component may be a luma component and the second colour component may be a chroma component.

It can be understood that, in the embodiments of the present disclosure, the "unit" may be part of an electrical circuit, part of a processor, part of a program or software, etc. Of course, the "unit" can also be modular or non-modular. Moreover, each element in the present embodiment may be integrated in one processing unit, or, each unit may exist physically alone, or, two or more units may be integrated in one unit. The aforementioned integrated unit can be realized either in the form of hardware or in the form of software function module.

If the aforementioned integrated unit is implemented in the form of a software functional module and sold or used as an independent product, it can be stored in a computer readable storage medium. Based on such an understanding, the technical solution of the present disclosure, in essence or the part that contributes to the existing technology or the all or part of the technical solution, can be embodied in the form of a software product. The computer software product is stored in a storage medium and includes a number of instructions to enable a computer device (which may be a personal computer, a server, or a network device, etc.) or a processor to perform all or part of the steps of the methods described in the embodiments of the present disclosure. The aforementioned storage media include a universal serial bus (USB) flash drive, a removable hard disk, a read-only memory (ROM), a random access memory (RAM), a magnetic disk, or an optical disc, which can store program code.

Thus, embodiments of the present disclosure provide a computer storage medium, applied to the encoder 120. The computer storage medium has stored thereon a computer program, and the computer program, when executed by a first processor, implements operations of the method of any of the aforementioned embodiments.

Figure 13:
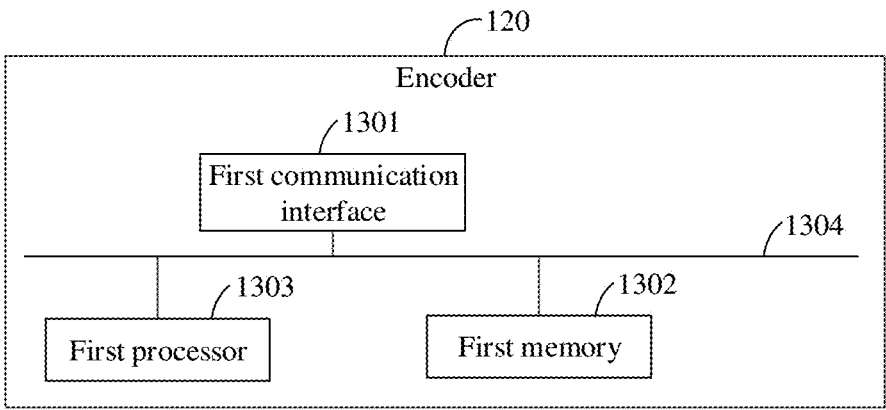
FIG. 13 illustrates a schematic diagram of a hardware structure of an encoder according to an embodiment of the present disclosure.

Based on the above structure of the encoder 120 and the computer storage medium, FIG. 13 illustrates a schematic diagram of a hardware structure of the encoder 120 according to an embodiment of the present disclosure. As shown in FIG. 13, the encoder 120 may include a first communication interface 1301, a first memory 1302 and a first processor 1303. The components are coupled together by a first bus system 1304. It can be understood that, the first bus system 1304 may be configured to implement connection communication between these components. The first bus system 1304 may include a power bus, a control bus and a status signal bus in addition to a data bus. However, for clarity, the various buses are denoted by the first bus system 1304 in FIG. 13.

The first communication interface 1301 may be configured to receive and transmit signals during the process of transmitting and receiving information with other external network elements.

The first memory 1302 may be configured to store a computer program capable of running on the first processor.

The first processor 1303 may be configured to perform, when running the computer program, the following operations: determining a prediction mode parameter of a current block; determining a reconstructed value of a first colour component of the current block and a value of a reference colour component of the current block, in response to the prediction mode parameter indicating determining a prediction value of the current block by using an attention-mechanism-based artificial neural network model (ANNM) mode; and predicting, according to the reconstructed value of the first colour component of the current block and the value of the reference colour component of the current block, a second colour component of the current block, to determine a prediction value of the second colour component of the current block.

It can be understood that, the first memory 1302 in the embodiments of the present disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), and is used as an external cache. Through exemplary but not limitative description, many forms of RAMs may be used, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM) and a direct rambus random access memory (DRRAM). The first memory 1302 of the systems and methods described herein is intended to include but not limited to these memories and any other suitable types of memories.

The first processor 1303 may be an integrated circuit chip, and has a signal processing capability. During implementation, the steps of the foregoing method embodiments may be implemented by using a hardware integrated logic circuit in the first processor 1303 or implemented by using instructions in a software form. The foregoing first processor 1303 described above may be a general purpose processor, a digital signal processor (DSP), an application-specific integrated circuit (ASIC), a field programmable gate array (FPGA), or another programmable logical device, discrete gate or transistor logical device, or discrete hardware component. The methods, steps and logical block diagrams disclosed in the embodiments of the disclosure may be implemented or performed. The general purpose processor may be a microprocessor or the processor may be any conventional processor and the like. Steps of the methods disclosed with reference to the embodiments of the disclosure may be directly executed and completed by means of a hardware decoding processor, or may be executed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium may be located in the first memory 1302, and the first processor 1303 may read the information in the first memory 1302 and complete the steps in the foregoing methods in combination with hardware of the processor.

It can be understood that, the embodiments described herein may be implemented in hardware, software, a firmware, a middleware, a micro bit or a combination thereof. For the hardware implementation, the processing unit may be implemented in one or more an application specific integrated circuit (ASIC), a digital signal processor (DSP), a digital signal processing device (DSPD), a programmable logic devices (PLD), a field-programmable gate arrays (FPGA), a general purpose processor, a controller, a micro-controller, a microprocessor, other electronic units for performing the functions described herein, or combinations thereof. For the software implementation, the techniques described herein may be implemented by modules (e.g. procedures, functions, etc.) that perform the functions described herein. The software code may be stored in a memory and executed by a processor. The memory can be implemented in the processor or outside the processor.

Alternatively, as another embodiment, the first processor 1303 may further configured to perform, when running the computer program, the method described in any of the aforementioned embodiments.

The embodiment provides the encoder, and the encoder may include a first determination unit and a first prediction unit. Therefore, the colour components of the current block is predicted by using an ANNM mode, which fully considers a relationship between the first colour component of the current block and the reference colour component of the current block, such that a more accurate prediction value of the second colour component can be obtained by using the ANNM mode, which can not only improve the accuracy of the colour component prediction, but also reduce the number of bits to be transmitted, thereby reducing the bitrate and further improving the coding efficiency.

Figure 14:
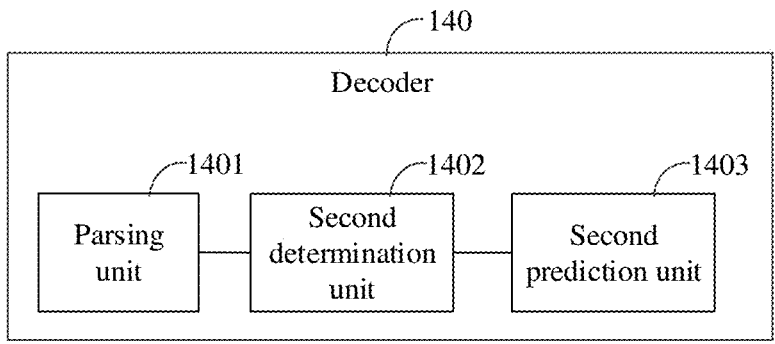
FIG. 14 illustrates a block diagram of a decoder according to an embodiment of the present disclosure.

In a further embodiment of the present disclosure, referring to the FIG. 14, FIG. 14 illustrates a block diagram of a decoder according to an embodiment of the present disclosure is shown. As shown in FIG. 14, the decoder 140 includes a parsing unit 1401, a second determination unit 1402, and a second prediction unit 1403.

The parsing unit 1401 is configured to parse a bitstream, to obtain a prediction mode parameter of a current block.

The second determination unit 1402 is configured to determine a reconstructed value of a first colour component of the current block and a value of a reference colour component of the current block, in response to the prediction mode parameter indicating determining a prediction value of the current block by using an attention-mechanism-based artificial neural network model (ANNM) mode.

The second prediction unit 1403 is configured to predict, according to the reconstructed value of the first colour component of the current block and the value of the reference colour component of the current block, a second colour component of the current block, to determine a prediction value of the second colour component of the current block.

In some embodiments, the parsing unit 1401 may be further configured to parse the bitstream, to obtain a mode flag bit for the current block, where the mode flag bit is configured to indicate a prediction mode to be used by the current block.

The second determination unit 1402 may be further configured to determine, according to the mode flag bit, the prediction mode parameter of the current block.

In some embodiments, the second determination unit 1402 may be specifically configured to determine the prediction mode parameter of the current block to indicate that the ANNM mode is to be used by the current block, in response to the mode flag bit being a first value; and determine the prediction mode parameter of the current block to indicate that the ANNM mode is not to be used by the current block, in response to the mode flag bit being a second value.

In some embodiments, the parsing unit 1401 may be further configured parse the bitstream, to obtain a mode index number for the current block, where the mode index number is configured to indicate a prediction mode to be used by the current block.

The second determination unit 1402 may be further configured to determine, according to the mode index number, the prediction mode parameter of the current block.

In some embodiments, the second determination unit 1402 may be specifically configured to determine the prediction mode parameter of the current block to indicate that the ANNM mode is to be used by the current block, in response to a value of the mode index number being equal to an index number corresponding to using the ANNM mode; and determine the prediction mode parameter of the current block to indicate that the ANNM mode is not to be used by the current block, in response to a value of the mode index number being not equal to an index number corresponding to using the ANNM mode.

In some embodiments, the first value may be 1 and the second value may be 0; or, the first value may be "true" and the second value may be "false".

In some embodiments, the first value may be 0 and the second value may be 1; or, the first value may be "false" and the second value may be "true".

In some embodiments, the reference colour component may include one or more colour components in a current picture, the current picture may be a picture in which the current block is located, and the one or more colour components may include at least one of the first colour component or the second colour component.

In some embodiments, the second determination unit 1402 may be specifically configured to determine the value of the reference colour component of the current block, according to at least one of a prediction value of the reference colour component or a reconstructed value of the reference colour component corresponding to adjacent pixels of the current block.

In some embodiments, the adjacent pixels of the current block may include at least one row of pixels adjacent to the current block.

In some embodiments, the adjacent pixels of the current block may include at least one column of pixels adjacent to the current block.

In some embodiments, the reference colour component may include one or more colour components in a reference picture, the reference picture may be a picture in which a prediction reference block of the current block is located, and the one or more colour components may include at least one of the first colour component or the second colour component.

In some embodiments, the parsing unit 1401 may be further configured to parse the bitstream, to obtain motion information parameters of the current block, where the motion information parameters include a motion vector and a reference picture index.

The second determination unit 1402 may be further configured to determine, according to the reference picture index, the reference picture of the current block; and determine, according to the motion vector, the prediction reference block of the current block in the reference picture.

In some embodiments, the second determination unit 1402 may be specifically configured to determine the reference pixels according to the prediction reference block of the current block; and determine, according to at least one of a prediction value or a reconstructed value of the reference pixels, the value of the reference colour component of the current block.

In some embodiments, the reference pixel may include part or all of pixels in the prediction reference block.

In some embodiments, the reference pixel may include adjacent pixels of the prediction reference block.

In some embodiments, the adjacent pixels of the prediction reference block may include at least one row of pixels adjacent to the prediction reference block.

In some embodiments, the adjacent pixels of the prediction reference block may include at least one column of pixels adjacent to the prediction reference block.

In some embodiments, the second prediction unit 1403 may be specifically configured to input the reconstructed value of the first colour component of the current block and the value of the reference colour component of the current block into a network model of the ANNM mode, and obtain an output result of the network model of the ANNM mode; and determine, according to the output result of the network model of the ANNM mode, the prediction value of the second colour component of the current block.

In some embodiments, the network model of the ANNM mode may include a first branch network, a second branch network, and a fusion network.

The first branch network may at least include a channel attention mechanism model, the second branch network may at least include a first convolution layer, and the fusion network may at least include a fusion layer and a second convolution layer, where a convolution kernel of the first convolution layer differs from a convolution kernel of the second convolution layer.

In some embodiments, the first branch network may further include at least one of following network layers: a sampling rate conversion layer, a concatenation layer, a fully connected layer, or a tiling operation layer.

In some embodiments, the second prediction unit 1403 may be further configured to input the value of the reference colour component of the current block into the first branch network, and obtain a first branch target feature map; input the reconstructed value of the first colour component of the current block into the second branch network, and obtain a second branch target feature map; and input the first branch target feature map and the second branch target feature map into the fusion network, and obtain the output result of the network model of the ANNM mode.

In some embodiments, the value of the reference colour component of the current block may include a value of the first colour component and a value of the second colour component.

The second prediction unit 1403 may be specifically configured to perform, through the sampling rate conversion layer, sampling rate conversion on the value of the first colour component, to obtain a value of the sampling-rate converted first colour component; concatenate, through the concatenation layer, the value of the sampling-rate converted first colour component with the value of the second colour component, to obtain a concatenation result; perform, through the fully connected layer, a full connection operation on the concatenation result, to obtain a first feature map;

perform, through the tiling operation layer, a tiling operation on the first feature map, to obtain a plurality of second feature maps; and redistribute, through the channel attention mechanism model, channel weights for the plurality of second feature maps, to obtain the first branch target feature map.

In some embodiments, the second prediction unit 1403 may be specifically configured to perform, through the at least one first convolution layer, a convolution operation on the reconstructed value of the first colour component of the current block, to obtain the second branch target feature map.

In some embodiments, the second prediction unit 1403 may be specifically configured to perform, through the fusion feature map, an addition operation on each pair of correspondingly located elements in the first branch target feature map and the second branch target feature map, to obtain a fused feature map; and perform, through the at least one second convolution layer, a convolution operation on the fused feature map, to obtain the output result of the network model of the ANNM mode.

In some embodiments, the second prediction unit 1403 may be specifically configured to set the prediction value of the second colour component of the current block to be equal to the output result of the network model of the ANNM mode.

In some embodiments, the second prediction unit 1403 may be specifically configured to filter the output result of the network model of the ANNM mode, to obtain a first filtered value; and set the prediction value of the second colour component of the current block to be equal to the first filtered value.

In some embodiments, the first colour component may be a luma component and the second colour component may be a chroma component.

It can be understood that, in the embodiment, the "unit" may be part of an electrical circuit, part of a processor, part of a program or software, etc. Of course, the "unit" can also be modular or non-modular. Moreover, each element in the present embodiment may be integrated in one processing unit, or, each unit may exist physically alone, or, two or more units may be integrated in one unit. The aforementioned integrated unit can be realized either in the form of hardware or in the form of software function module.

If the aforementioned integrated unit is implemented in the form of a software functional module and sold or used as an independent product, it can be stored in a computer readable storage medium. Based on such an understanding, the embodiment provides a computer storage medium, applied to the decoder 140. The computer storage medium has stored thereon a computer program, and the computer program, when executed by a second processor, implements operations of the method of any of the aforementioned embodiments.

Figure 15:
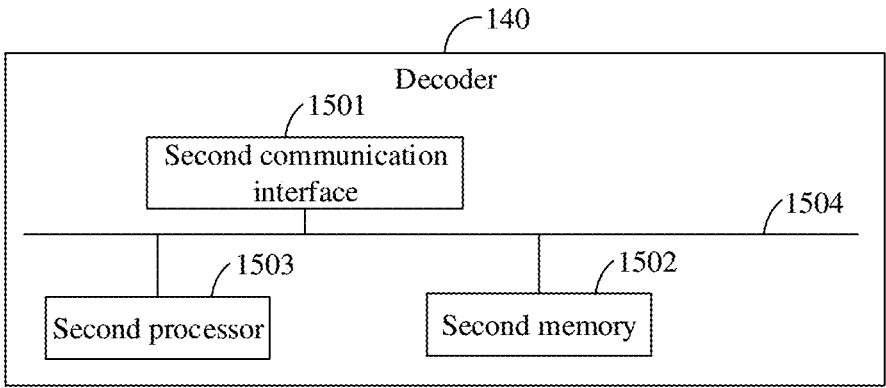
FIG. 15 illustrates a schematic diagram of a hardware structure of a decoder according to an embodiment of the present disclosure.

Based on the above structure of the decoder 140 and the computer storage medium, FIG. 15 illustrates a schematic diagram of a hardware structure of the decoder 140 according to an embodiment of the present disclosure. As shown in FIG. 15, the decoder 140 may include a second communication interface 1501, a second memory 1502 and a second processor 1503. The components are coupled together by a second bus system 1504. It can be understood that, the second bus system 1504 may be configured to implement connection communication between these components. The second bus system 1504 may include a power bus, a control bus and a status signal bus in addition to a data bus.

However, for clarity, the various buses are denoted by the second bus system 1504 in FIG. 15.

The second communication interface 1501 may be configured to receive and transmit signals during the process of transmitting and receiving information with other external network elements.

The second memory 1502 may be configured to store a computer program capable of running on the first processor.

The second processor 1503 may be configured to perform, when running the computer program, the following operations: parsing a bitstream, to obtain a prediction mode parameter of a current block; determining a reconstructed value of a first colour component of the current block and a value of a reference colour component of the current block, in response to the prediction mode parameter indicating determining a prediction value of the current block by using an attention-mechanism-based artificial neural network model (ANNM) mode; and predicting, according to the reconstructed value of the first colour component of the current block and the value of the reference colour component of the current block, a second colour component of the current block by using the ANNM mode, to determine a prediction value of the second colour component of the current block.

Alternatively, as another embodiment, the second processor 1503 may be further configured to perform, when running the computer program, the method described in any of the aforementioned embodiments.

It can be understood that, the second memory 1502 may be similar in hardware function to the first memory 1302, and the second processor 1503 may be similar in hardware function to the first processor 1303, which will not be described in details herein.

The embodiment provides the decoder, and the decoder may include a parsing unit, a second determination unit, and a second prediction unit. Therefore, the colour component of the current block is predicted by using the ANNM mode, which fully considers a relationship between the first colour component of the current block and the reference colour component of the current block, such that a more accurate prediction value of the second colour component can be obtained by using the ANNM mode, which can not only improve the accuracy of the colour component prediction, but also reduce the number of bits to be transmitted, thereby reducing the bitrate and further improving the decoding efficiency.

The embodiments of the present disclosure provide a picture prediction method, an encoder, a decoder and a computer storage medium, which can improve the prediction accuracy of a colour component, thereby reducing the bitrate and further improving the coding and decoding efficiency.

The technical solutions are implemented as follows.

According to a first aspect, an embodiment of the present disclosure provides a picture prediction method, which is applied to an encoder; the method includes:

determining a prediction mode parameter of a current block;

determining a reconstructed value of a first colour component of the current block and a value of a reference colour component of the current block, in response to the prediction mode parameter indicating determining a prediction value of the current block by using an attention-based artificial neural network model (ANNM) mode; and predicting, according to the reconstructed value of the first colour component of the current block and the value of the reference colour component of the current block, a second colour component of the current block by using the ANNM mode, to determine a prediction value of the second colour component of the current block.

According to a second aspect, an embodiment of the present disclosure provides a picture prediction method, which is applied to a decoder; the method includes:

parsing a bitstream, to obtain a prediction mode parameter of a current block;

determining a reconstructed value of a first colour component of the current block and a value of a reference colour component of the current block, in response to the prediction mode parameter indicating determining a prediction value of the current block by using an attention-based artificial neural network model (ANNM) mode; and predicting, according to the reconstructed value of the first colour component of the current block and the value of the reference colour component of the current block, a second colour component of the current block by using the ANNM mode, to determine a prediction value of the second colour component of the current block.

According to a third aspect, an embodiment of the present disclosure provides an encoder, and the encoder includes a first determination unit and a first prediction unit.

The first determination unit is configured to determine a prediction mode parameter of a current block.

The first determination unit is further configured to determine a reconstructed value of a first colour component of the current block and a value of a reference colour component of the current block, in response to the prediction mode parameter indicating determining a prediction value of the current block by using an attention-based artificial neural network model (ANNM) mode.

The first prediction unit is configured to predict, according to the reconstructed value of the first colour component of the current block and the value of the reference colour component of the current block, a second colour component of the current block by using the ANNM mode, to determine a prediction value of the second colour component of the current block.

According to a fourth aspect, an embodiment of the present disclosure provides an encoder, and the encoder includes a first memory and a first processor.

The first memory is configured to store a computer program capable of running in the first processor.

The first processor is configured to perform, when running the computer program, the aforementioned method according to the first aspect.

According to a fifth aspect, an embodiment of the present disclosure provides a decoder, and the decoder includes a parsing unit, a second determination unit, and a second prediction unit.

The parsing unit is configured to parse a bitstream, to obtain a prediction mode parameter of a current block.

The second determination unit is configured to determine a reconstructed value of a first colour component of the current block and a value of a reference colour component of the current block, in response to the prediction mode parameter indicating determining a prediction value of the current block by using an attention-based artificial neural network model (ANNM) mode.

The second prediction unit is configured to predict, according to the reconstructed value of the first colour component of the current block and the value of the reference colour component of the current block, a second colour component of the current block by using the ANNM mode, to determine a prediction value of the second colour component of the current block.

According to a sixth aspect, an embodiment of the present disclosure provides a decoder, and the decoder includes a second memory and a second processor.

The second memory is configured to store a computer program capable of running in the first processor.

The second processor is configured to perform, when running the computer program, the aforementioned method according to the second aspect.

According to a seventh aspect, an embodiment of the present disclosure provides a computer-readable storage medium having stored thereon a computer program, wherein the computer program, when executed by a first processor, implements operations of the aforementioned method according to the first aspect; or, when executed by the second processor, implements operations of the aforementioned method according to the second aspect.

The embodiments of the present disclosure provide a picture prediction method, an encoder, a decoder and a computer storage medium. A prediction mode parameter of a current block is determined; a reconstructed value of a first colour component of the current block and a value of a reference colour component of the current block are determined, in response to the prediction mode parameter indicating determining a prediction value of the current block by using an attention-based artificial neural network model (ANNM) mode; and a second colour component of the current block is predicted by using the ANNM mode according to the reconstructed value of the first colour component of the current block and the value of the reference colour component of the current block, to determine a prediction value of the second colour component of the current block. Therefore, the present disclosure proposes predicting the colour components of the current block by using an ANNM mode, which fully considers a relationship between the first colour component of the current block and the reference colour component of the current block, such that a more accurate prediction value of the second colour component can be obtained by using the ANNM mode, which can not only improve the accuracy of the colour component prediction, but also reduce the number of bits to be transmitted, thereby reducing the bitrate and further improving the coding and decoding efficiency.

It should be noted that, in the present disclosure, the term of "include", "contain" or any other variants may be intended to cover non-exclusive inclusion, such that a process, a method, an article or a device that includes a set of elements may include not only those elements but also other elements that are not explicitly listed, or also elements inherent to such process, method, article or device. In the absence of further limitations, an element defined by the phrase "includes an . . . " does not preclude the existence of another identical element in the process, method, article or device in which it is included.

The above numbers of the embodiments of the present disclosure are for description only and do not represent the advantages and disadvantages of the embodiments.

The methods disclosed in several method embodiments provided in the present disclosure can be arbitrarily combined without conflict, to obtain new method embodiments.

The features disclosed in several product embodiments provided in the present disclosure can be arbitrarily combined without conflict, to obtain new product embodiments.

The features disclosed in several method embodiments or apparatus embodiments provided in the present disclosure can be arbitrarily combined without conflict, to obtain new method embodiments or apparatus embodiments.

The above is only the specific implementation of the present disclosure, but the scope of protection of the present disclosure is not limited thereto. Any technical person familiar with the technical field who can easily think of changes or substitutions within the technical scope disclosed in the present disclosure should be covered within the scope of protection of the present disclosure. Therefore, the scope of protection of the present disclosure shall be subject to the scope of protection of the claims.

INDUSTRIAL PRACTICALITY

In the embodiment of that present disclosure, in an encoder or decoder, after obtaining a prediction mode parameter of a current block, a reconstructed value of a first colour component of the current block and a value of a reference colour component of the current block is determined, in response to the prediction mode parameter indicating determining a prediction value of the current block by using an attention-mechanism-based artificial neural network model (ANNM) mode; and a second colour component of the current block is predicted by using the ANNM mode according to the reconstructed value of the first colour component of the current block and the value of the reference colour component of the current block, to determine a prediction value of the second colour component of the current block. Therefore, the present disclosure proposes an ANNM mode for predicting the colour components of the current block, which fully considers a relationship between the first colour component and the reference colour component of the current block, such that a more accurate prediction value of the second colour component can be obtained by using the ANNM mode, which can not only improve the accuracy of the colour component prediction, but also reduce the number of bits to be transmitted, thereby reducing the bitrate and further improving the coding and decoding efficiency.

The invention claimed is:

1. A picture prediction method, applied to an encoder, the method comprising:

determining a prediction mode parameter of a current block;

determining a reconstructed value of a first colour component of the current block and a value of a reference colour component of the current block, in response to the prediction mode parameter indicating determining a prediction value of the current block by using an attention-based artificial neural network model (ANNM) mode; and predicting, according to the reconstructed value of the first colour component of the current block and the value of the reference colour component of the current block, a second colour component of the current block by using the ANNM mode, to determine a prediction value of the second colour component of the current block;

wherein the reference colour component comprises one or more colour components in a reference picture, the reference picture is a picture in which a prediction reference block of the current block is located, the one or more colour components comprise:

the second colour component, or the first colour component and the second colour component, wherein the reference picture differs from a current picture in which the current block is located.

2. The method of claim 1, wherein determining the prediction mode parameter of the current block comprises:

determining a target prediction mode for the current block from a first candidate prediction mode set, wherein the first candidate prediction mode set comprises one or more candidate prediction modes, and the first candidate prediction mode set does not comprise the ANNM mode; and determining, based on the ANNM mode and the target prediction mode, the prediction mode parameter of the current block.

3. The method of claim 1, wherein determining the prediction mode parameter of the current block comprises:

determining a second candidate prediction mode set, wherein the second candidate prediction mode set comprises one or more candidate prediction modes, and the second candidate prediction mode set further comprises the ANNM mode;

precoding the current block by using the one or more candidate prediction modes in the second candidate prediction mode set respectively, to determine one or more pre-coding results, each corresponding to a respective one of the one or more candidate prediction modes; and determining, based on the one or more pre-coding results, the prediction mode parameter of the current block from the one or more candidate prediction modes.

4. The method of claim 1, wherein after determining the prediction mode parameter of the current block, the method further comprises:

setting a mode flag bit for the current block, wherein the mode flag bit is configured to indicate a prediction mode to be used by the current block; and signaling the mode flag bit into a bitstream, wherein setting the mode flag bit for the current block comprises:

setting the mode flag bit to be a first value, in response to the prediction mode parameter of the current block indicating that the ANNM mode is to be used by the current block; and setting the mode flag bit to be a second value, in response to the prediction mode parameter of the current block indicating that the ANNM mode is not to be used by the current block.

5. The method of claim 1, wherein after determining the prediction mode parameter of the current block, the method further comprises:

setting a mode index number for the current block, wherein the mode index number is configured to indicate a prediction mode to be used by the current block; and signaling the mode index into a bitstream.

6. The method of claim 1, wherein predicting, according to the reconstructed value of the first colour component of the current block and the value of the reference colour component of the current block, the second colour component of the current block by using the ANNM mode, to determine the prediction value of the second colour component of the current block comprises:

inputting the reconstructed value of the first colour component of the current block and the value of the reference colour component of the current block into a network model of the ANNM mode, and obtaining an output result of the network model of the ANNM mode; and determining, according to the output result of the network model of the ANNM mode, the prediction value of the second colour component of the current block.

7. The method of claim 6, wherein the network model of the ANNM mode comprises a first branch network, a second branch network, and a fusion network;

wherein the first branch network at least comprises a channel attention mechanism model, the second branch network at least comprises a first convolution layer, and the fusion network at least comprises a fusion layer and a second convolution layer, wherein a convolution kernel of the first convolution layer differs from a convolution kernel of the second convolution layer.

8. A picture prediction method, applied to a decoder, the method comprising:

parsing a bitstream, to obtain a prediction mode parameter of a current block;

determining a reconstructed value of a first colour component of the current block and a value of a reference colour component of the current block, in response to the prediction mode parameter indicating determining a prediction value of the current block by using an attention-based artificial neural network model (ANNM) mode; and predicting, according to the reconstructed value of the first colour component of the current block and the value of the reference colour component of the current block, a second colour component of the current block by using the ANNM mode, to determine a prediction value of the second colour component of the current block;

wherein the reference colour component comprises one or more colour components in a reference picture, the reference picture is a picture in which a prediction reference block of the current block is located, the one or more colour components comprise:

the second colour component, or the first colour component and the second colour component, wherein the reference picture differs from a current picture in which the current block is located.

9. The method of claim 8, wherein parsing the bitstream, to obtain the prediction mode parameter of the current block comprises:

parsing the bitstream, to obtain a mode flag bit for the current block, wherein the mode flag bit is configured to indicate a prediction mode to be used by the current block; and determining, according to the mode flag bit, the prediction mode parameter of the current block, and wherein determining, according to the mode flag bit, the prediction mode parameter of the current block comprises:

determining the prediction mode parameter of the current block to indicate that the ANNM mode is to be used by the current block, in response to the mode flag bit being a first value; and determining the prediction mode parameter of the current block to indicate that the ANNM mode is not to be used by the current block, in response to the mode flag bit being a second value.

10. The method of claim 8, wherein parsing the bitstream, to obtain the prediction mode parameter of the current block comprises:

parsing the bitstream, to obtain a mode index number for the current block, wherein the mode index number is configured to indicate a prediction mode to be used by the current block; and determining, according to the mode index number, the prediction mode parameter of the current block.

11. The method of claim 8, wherein the method further comprises:

parsing the bitstream, to obtain motion information parameters of the current block, wherein the motion information parameters comprise a motion vector and a reference picture index;

determining, according to the reference picture index, the reference picture of the current block; and determining, according to the motion vector, the prediction reference block of the current block in the reference picture.

12. The method of claim 8, wherein determining the value of the reference colour component of the current block comprises:

determining, according to the prediction reference block of the current block, reference pixels; and determining, according to at least one of a prediction value or a reconstructed value of the reference pixels, the value of the reference colour component of the current block, wherein the reference pixels comprise: part or all of pixels in the prediction reference block, or adjacent pixels of the prediction reference block; and wherein the adjacent pixels of the prediction reference block comprise: at least one row of pixels adjacent to the prediction reference block, or at least one column of pixels adjacent to the prediction reference block.

13. The method of claim 8, wherein predicting, according to the reconstructed value of the first colour component of the current block and the value of the reference colour component of the current block, the second colour component of the current block, to determine the prediction value of the second colour component of the current block comprises:

inputting the reconstructed value of the first colour component of the current block and the value of the reference colour component of the current block into a network model of the ANNM mode, and obtaining an output result of the network model of the ANNM mode; and determining, according to the output result of the network model of the ANNM mode, the prediction value of the second colour component of the current block.

14. The method of claim 13, wherein determining, according to the output result of the network model of the ANNM mode, the prediction value of the second colour component of the current block comprises:

setting the prediction value of the second colour component of the current block to be equal to the output result of the network model of the ANNM mode, or wherein determining, according to the output result of the network model of the ANNM mode, the prediction value of the second colour component of the current block comprises:

filtering the output result of the network model of the ANNM mode, to obtain a first filtered value; and setting the prediction value of the second colour component of the current block to be equal to the first filtered value.

15. A decoder comprising a second memory and a second processor; wherein, the second memory is configured to store a computer program capable of running on the second processor; and the second processor, when running the computer program, is configured to:

parse a bitstream, to obtain a prediction mode parameter of a current block;

determine a reconstructed value of a first colour component of the current block and a value of a reference colour component of the current block, in response to the prediction mode parameter indicating determining a prediction value of the current block by using an attention-based artificial neural network model (ANNM) mode; and predict, according to the reconstructed value of the first colour component of the current block and the value of the reference colour component of the current block, a second colour component of the current block by using the ANNM mode, to determine a prediction value of the second colour component of the current block;

wherein the reference colour component comprises one or more colour components in a reference picture, the reference picture is a picture in which a prediction reference block of the current block is located, the one or more colour components comprise:

the second colour component, or the first colour component and the second colour component, wherein the reference picture differs from a current picture in which the current block is located.

16. The decoder of claim 15, wherein the first colour component is a luma component and the second colour component is a chroma component.

* * * * *